US012521086B1

(12) United States Patent
Barve et al.

(10) Patent No.: US 12,521,086 B1
(45) Date of Patent: Jan. 13, 2026

(54) SYSTEM AND METHOD FOR SWEEP TRAJECTORY GUIDANCE

(71) Applicant: Anumana, Inc., Cambridge, MA (US)

(72) Inventors: Rakesh Barve, Bengaluru (IN); Sidharth Abrol, Bengaluru (IN); Sai Saketh Chennamsetty, Bengaluru (IN); Suthirth Vaidya Subramany, Bengaluru (IN); Abhijith Chunduru, Bengaluru (IN)

(73) Assignee: Anumana, Inc., Cambridge, MA (US)

( * ) Notice: Subject to any disclaimer, the term of this patent is extended or adjusted under 35 U.S.C. 154(b) by 0 days.

(21) Appl. No.: 19/189,803

(22) Filed: Apr. 25, 2025

(51) Int. Cl.
*A61B 8/12* (2006.01)
*A61B 8/00* (2006.01)
*A61B 8/08* (2006.01)

(52) U.S. Cl.
CPC .............. *A61B 8/12* (2013.01); *A61B 8/0883* (2013.01); *A61B 8/461* (2013.01); *A61B 8/483* (2013.01); *A61B 8/54* (2013.01)

(58) Field of Classification Search
CPC ......... A61B 8/12; A61B 8/0883; A61B 8/461; A61B 8/483; A61B 8/54
See application file for complete search history.

(56) References Cited

U.S. PATENT DOCUMENTS

2013/0259341 A1* 10/2013 Mountney .............. A61B 6/503
  382/131
2016/0374644 A1 12/2016 Mauldin, Jr. et al.
2019/0076120 A1 3/2019 Shoudy
2019/0340838 A1* 11/2019 Gluhovsky .......... A61B 5/0044
2021/0059758 A1* 3/2021 Avendi .................... A61B 8/469
2021/0369249 A1* 12/2021 Toporek .............. A61B 8/4263
(Continued)

FOREIGN PATENT DOCUMENTS

CN        113870636 A     12/2021
WO        2018115200 A1    6/2018
WO        2020055435 A1    3/2020

OTHER PUBLICATIONS

Yuan Bi et al; VesNet-RL: Simulation-based Reinforcement Learning for Real-World US Probe Navigation; IEEE Robotics and Automation Letters. Preprint Version. Accepted Apr. 2022.
(Continued)

*Primary Examiner* — Bo Joseph Peng
(74) *Attorney, Agent, or Firm* — Caldwell Intellectual Property Law

(57) ABSTRACT

A system for sweep trajectory guidance may include a catheter coupled to at least a transducer, wherein the at least a transducer is configured to receive ultrasound data, at least a localization system configured to detect probe position data as a function of a location of the catheter, at least a processor communicatively connected to the transducer, and a memory communicatively connected to the at least a processor, wherein the memory contains instructions configuring the at least a processor to receive, by the at least a processor, the ultrasound data and the probe position data, generate, using a trained sweep trajectory simulation model, a movement vector as a function of the ultrasound data and the probe position data, determine, using the movement vector, real-time guidance data, and display the real-time guidance data to a user through at least a user interface.

20 Claims, 10 Drawing Sheets

(56) References Cited

U.S. PATENT DOCUMENTS

2022/0401062 A1    12/2022   Naidu et al.
2024/0050061 A1    2/2024    McLaughlin et al.

OTHER PUBLICATIONS

A A Amadou et al; Cardiac ultrasound simulation for autonomous ultrasound navigation; Front Cardiovasc Med. Aug. 13, 2024.
Yuan Bi et al; Autonomous Path Planning for Intercostal Robotic Ultrasound Imaging Using Reinforcement Learning "License: arXiv.org perpetual non-exclusive licensearXiv:2404.09927v1 [cs.RO] Apr. 15, 2024".

* cited by examiner

SYSTEM AND METHOD FOR SWEEP TRAJECTORY GUIDANCE

FIELD OF THE INVENTION

The present invention generally relates to the field of medical procedure guidance. In particular, the present invention is directed to systems and methods for sweep trajectory guidance.

BACKGROUND

Sweep trajectories in ultrasonic procedures of organs refer to the deliberate pattern in which an ultrasound probe moves or "sweeps" across organs to acquire detailed images or Doppler signals. These procedures, commonly performed in echocardiography, are essential for assessing organ function, including the motion of heart valves, blood flow, and myocardial performance. During an echocardiographic examination, the ultrasound probe may follow specific trajectories, such as sector sweeps or linear scans, depending on the type of view required. The choice of trajectory influences the quality and depth of the images or Doppler signals obtained, providing a comprehensive view of organs from various angles. This flexibility enables clinicians to visualize organs in a manner that is tailored to specific diagnostic needs. Current systems and methodologies rely on clinicians' knowledge of anatomical landmarks.

SUMMARY OF THE DISCLOSURE

In an aspect, a system for sweep trajectory guidance may include a catheter coupled to at least a transducer, wherein the at least a transducer is configured to receive ultrasound data, at least a localization system configured to detect probe position data as a function of a location of the catheter, at least a processor communicatively connected to the transducer, and a memory communicatively connected to the at least a processor, wherein the memory contains instructions configuring the at least a processor to receive, by the at least a processor, the ultrasound data and the probe position data, generate, using a trained sweep trajectory simulation model, a movement vector as a function of the ultrasound data and the probe position data, determine, using the movement vector, real-time guidance data, and display the real-time guidance data to a user through at least a user interface.

In another aspect, a method for sweep trajectory guidance may include receiving, from at least a transducer, ultrasound data, detecting, using a localization system, probe position data as a function of a location of the catheter, wherein the catheter is coupled to the at least a transducer, receiving, by at least a processor, the ultrasound data and the probe position data, generating, using a trained sweep trajectory simulation model, a movement vector as a function of the ultrasound data and the probe position data, determining, using the movement vector, real-time guidance data, and displaying the real-time guidance data to a user through at least a user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for sweep trajectory guidance. In an embodiment, systems and methods for sweep trajectory guidance may guide a user in an ultrasonic procedure.

Aspects of the present disclosure can be used to visually, auditorily, and/or haptically prompt a user during an ultrasonic procedure in order to accomplish an optimized sweep trajectory. Aspects of the present disclosure can also be used to train a user in a simulation of an ultrasonic procedure. This is so, at least in part, because the guidance provided by systems and methods herein may include visuals that allow a user to simulate real-time ultrasonic procedures and its related conditions.

Aspects of the present disclosure allow for systems and methods for sweep trajectory guidance. Exemplary embodiments illustrating aspects of the present disclosure are described below in the context of several specific examples.

Figure 1:
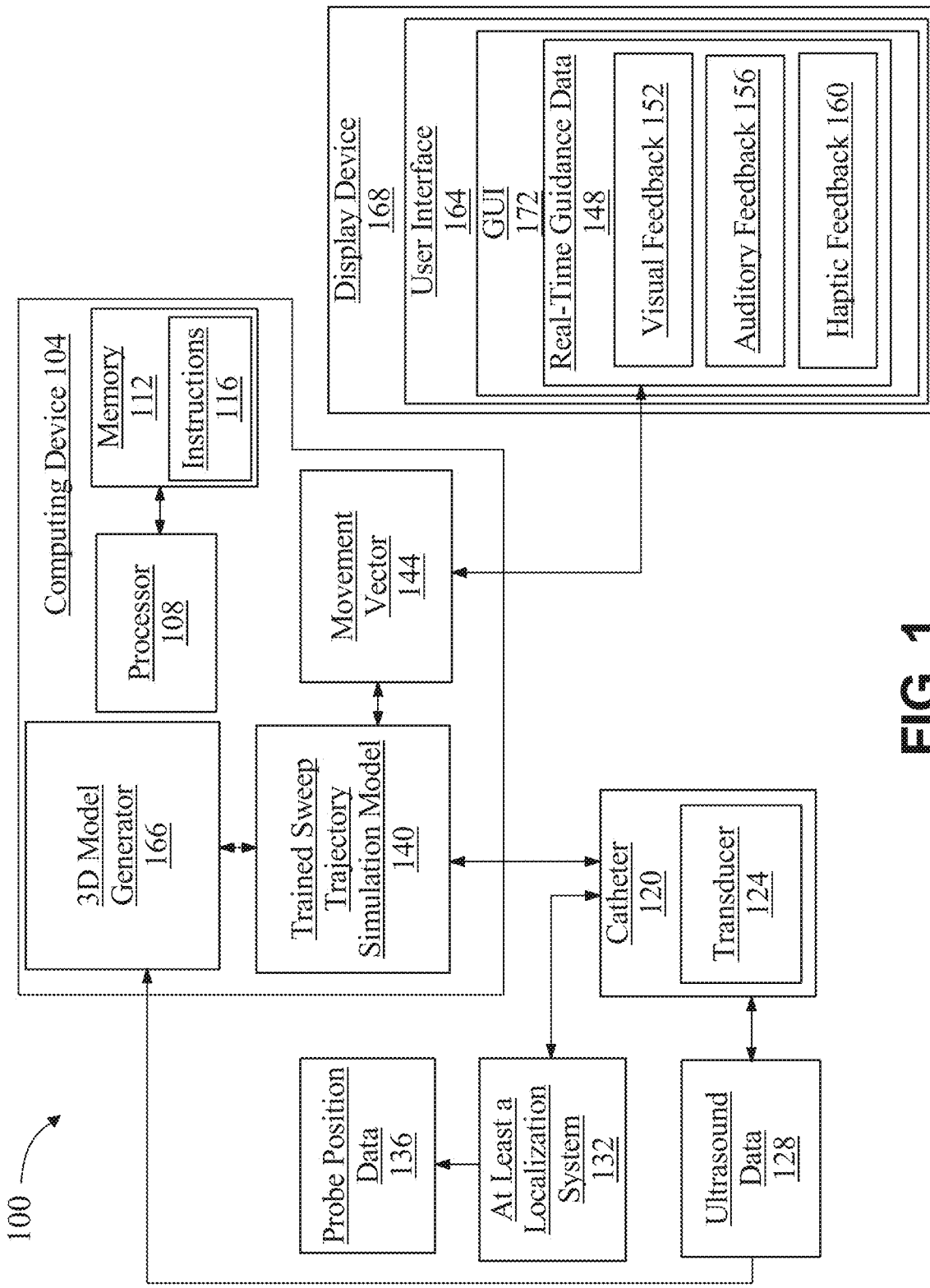
FIG. 1 is a block diagram of an exemplary embodiment of a system for sweep trajectory guidance.

Referring now to FIG. 1, an exemplary embodiment of a system 100 for sweep trajectory guidance is illustrated. System 100 may include a catheter 120 coupled to at least a transducer 124, wherein the at least a transducer 124 is configured to receive ultrasound data 128, at least a localization system 132 configured to detect probe position data 136 as a function of a location of the catheter 120, at least a processor 108 communicatively connected to the transducer 124, and a memory 112 communicatively connected to the at least a processor 108, wherein the memory 112 contains instructions 116 configuring the at least a processor 108 to receive, by the at least a processor 108, the ultrasound data 128 and the probe position data 136, generate, using a trained sweep trajectory simulation model 140, a movement vector 144 as a function of the ultrasound data 128 and the probe position data 136, determine, using the movement vector 144, real-time guidance data 148, and display the real-time guidance data 148 to a user through at least a user interface 164.

In continued reference to FIG. 1, system 100 may include a computing device 104. Computing device 104 includes a processor communicatively connected to a memory 112. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In further reference to FIG. 1, system 100 may include a catheter 120 coupled to at least a transducer 124, wherein the at least a transducer 124 is configured to receive ultrasound data 128. As used herein, a "catheter" is a thin, flexible tube used to perform medical procedures. In some embodiments, a catheter may be used to access the heart, blood vessels, or other organs. In an embodiment, a catheter 120 may include a cardiac catheter. A catheter 120, as described herein, and its associated data may be consistent with one or more aspects of the catheters as described in U.S. patent application Ser. No. 18/920,065, filed on Oct. 18, 2024, titled "SYSTEMS AND METHODS FOR ARTIFICIAL INTELLIGENCE ASSISTED MEDICAL DEVICE LOCALIZATION," which is incorporated by reference herein in its entirety.

Continuing to reference FIG. 1, for purposes of this disclosure, at least a "transducer" is a device that converts one form of energy into another. For example, at least a transducer 124 may take a physical input, such as sound, light, and/or pressure, and convert it into an electrical signal, or vice versa. In an embodiment, at least a transducer 124 may include several types of transducers to monitor various physiological parameters. For example, this may include, without limitation, pressure transducers, temperature transducers, electrochemical transducers, and/or ultrasound transducers.

In further reference to FIG. 1, "ultrasound data," as used herein refers to measured acoustic signals captured during an ultrasound procedure. For example, ultrasound data 128 may include the imaging obtained from ultrasound signals, such as sound waves emitted by the probe and the echoes that return from tissues. Further, ultrasound data 128 may include imaging data, echo signal data, brightness mode image data, doppler ultrasound data, 3D/4D ultrasound data, elastography (tissue stiffness) data, motion mode data, tissue characterization and imaging parameters, quantitative measurements, time and motion data, color doppler data, power doppler data, color-enhanced ultrasound data, and/or other associated data. Additionally, and/or alternatively, ultrasound data 128 may include pseudo data, such as 3D reconstructed images, surface models, fusion data, and/or the like. In one or more embodiments, ultrasound data 128 may include TEE data, CT data, point-of-care ultrasound data, and/or the like. Further, in some embodiments, this data may mimic what would be obtained from real ultrasound scans but may include pseudo data generated from plurality of 3D imaging data.

In continued reference to FIG. 1, system 100 may include at least a localization system 132 configured to detect probe position data 136 as a function of a location of the catheter 120. For purposes of this disclosure, at least a "localization system" refers to a system and/or software used to track the position and/or orientation of a catheter within the body. In an embodiment, at least a localization system 132 may implement one or more of: electromagnetic tracking, fluoroscopy, optical tracking, ultrasound-based localization, and/or the like. Electromagnetic tracking may use electromagnetic fields to track a catheter's 120 position inside the body using sensors that may interact with an external magnetic field. Fluoroscopy, otherwise known as X-ray imaging, may be used to visualize a catheter's 120 position in real-time using continuous X-ray imaging. In some cases, optical tracking may be used, which utilizes optical sensors to monitor a catheter's 120 position and provide precise navigation. Further, ultrasound-based localization may include utilizing intravascular ultrasound (IVUS) to localize a catheter 120 and provide detailed images of the coronary arteries and/or heart chambers, allowing for better guidance during a procedure.

At least a localization system 132, as described herein, and its associated data may be consistent with one or more aspects of the systems and methods of localization as described in U.S. patent application Ser. No. 19/188,942, filed on Apr. 24, 2025, titled "APPARATUS AND METHOD FOR CONTROLLING A ROBOTIC FRAMEWORK TO PERFORM IMAGING MODALITIES," as further described in U.S. patent application Ser. No. 18/920,065, filed on Oct. 18, 2024, titled "SYSTEMS AND METHODS FOR ARTIFICIAL INTELLIGENCE ASSISTED MEDICAL DEVICE LOCALIZATION," and as further described in U.S. patent application Ser. No. 18/764,853, filed on Jul. 5, 2024, titled "SSYSTEM AND METHOD FOR LOCATING A MEDICAL DEVICE USING AN ELECTRICAL FIELD CREATION," each of which is incorporated by reference herein in their entirety.

With continued reference to FIG. 1, In an embodiment, at least a localization system 132 may include an ultrasound-based localization system. As used in this disclosure, an "ultrasound-based localization system" is a method used to determine the position and movement of objects within the body by employing high-frequency sound waves. The ultrasound-based localization system may involve the use of an ultrasound transducer that emits sound waves, which then reflect off internal structures and are captured by transducer 124 or other sensors. Continuing, the reflected sound waves are processed to create real-time images or data points that represent the location and motion of the tracked object, such as a catheter 120 or other medical instruments. The ultrasound-based localization system may be particularly useful in medical procedures because it provides real-time, non-invasive visualization of internal body structures. The ultrasound-based localization system may allow clinicians to guide instruments accurately within the body, enhancing the precision and safety of procedures like catheter ablation, biopsies, or other interventions. This technology is often integrated with other systems to provide comprehensive spatial and functional mapping of the area being treated. For example, at least a localization system 132 may utilize ultrasound technology, where an array of ultrasound transducers is positioned around the patient. At least a catheter 120 may be fitted with miniature ultrasound receivers, detects the emitted ultrasound waves. At least a localization system 132 may calculate at least a catheter 120 position based on the time it takes for the ultrasound waves to reach the receivers, allowing for precise localization of at least a catheter tip during a procedure.

With continued reference to FIG. 1, "probe position data," as used herein, refers to the spatial information about an ultrasound probe's location and/or orientation. For example, probe position data 136 may include, without limitation, spatial coordinates, orientation and angle, probe position in relation to the body, tracking data, probe depth and pressure, probe type and configuration, ultrasound beam direction, tracking system integration data, calibration information, temporal data, probe velocity, and/or other associated data. In an embodiment, probe position data 136 may record the ultrasound probe's movements, angles, and/or the depth of the scanning field, ensuring accurate representation of how different probe positions may affect the ultrasound image. This data may allow for dynamic visualizations and interactions during an ultrasound procedure.

In further reference to FIG. 1, in a non-limiting example, the probe position data 136 may be derived from ultrasonic feedback, where at least a localization system 132 uses an array of transducers to emit ultrasonic waves and detect their reflections from the catheter 120. The resulting probe position data 136 may indicate the spatial coordinates of the catheter 120 within the body and can be processed to adjust its trajectory dynamically. In a non-limiting example, probe position data 136 may be represented as Cartesian coordinates (x, y, z) that define the location of the catheter 120 within a three-dimensional (3D) space. For instance, at least a localization system 132 may generate position signals such as (12.5, 8.3, 4.7), indicating the exact spatial position of the catheter 120 relative to a defined origin point. Continuing, these coordinates may be continuously updated in real time to reflect the movement of the catheter 120, allowing precise tracking and guidance during a medical procedure. In another non-limiting example, probe position data 136 may include additional data such as orientation or angular displacement. For instance, the probe position data 136 may take the form of a six-dimensional representation (x, y, z, roll, pitch, yaw), where the first three dimensions define the location and the latter three define the orientation of the catheter 120. Continuing, this may enable at least a localization system 132 to provide more detailed guidance, particularly for tasks requiring precise alignment, such as positioning an ultrasonic transducer at a specific angle relative to a target region. In another non-limiting example, the probe position data 136 may be expressed as polar coordinates (r, θ, φ), where "r" represents the radial distance from a reference point, "θ" the azimuthal angle, and "φ" the polar angle. Such a representation may be particularly useful in applications involving circular or spherical navigation paths, such as guiding a catheter 120 around the walls of a heart chamber or within a curved blood vessel. Continuing, these probe position data 136 may then be converted into actionable movement instructions for a user to control the trajectory of the catheter 120 effectively.

In further reference to FIG. 1, in an embodiment, probe position data 136 may include a position, orientation, and velocity of an ultrasound probe in relation to at least a 3D model and one or more movements of the ultrasound probe in relation to at least a 3D model. In an embodiment, probe position data 136 may capture both static and/or dynamic information. For example, position may include the spatial coordinates of the ultrasound probe at a given moment in time, indicating its location relative to a target 3D model. This may aid in mapping the exact placement of the probe relative to a patient and/or a specific region of interest within the model. Orientation may include the angular position and/or rotation of the ultrasound probe, in some cases, orientation may be represented as a set of angles and/or rotation matrix that describes the ultrasound probe's angle relative to a reference plane, such as the anatomical position of a patient and/or a model. The orientation may ensure that the ultrasound probe is aligned correctly for imaging from the appropriate angle. One or more movements may include data describing the continuous and/or discrete movements of an ultrasound probe over time in relation to a 3D model. For example, this may include the trajectory and/or path taken by the ultrasound probe, as well as changes in orientation as a user manipulates the ultrasound probe. Further, one or more movements may help track how the ultrasound probe is swept across the model and/or how it rotates. In an embodiment, the ultrasound probe position data 136 may be tied to one or more 3D models representing the anatomy or organs of interest. The 3D models may include models derived from a plurality of 3D imaging data, which may, in some cases, include 3D models constructed from 2D images/scans.

In continued reference to FIG. 1, 3D models and their generation, as described herein, may be consistent with one or more aspects of the systems and methods of generating 3D models as described in U.S. patent application Ser. No. 18/818,034, filed on Aug. 28, 2024, titled "APPARATUS AND METHODS FOR GENERATING A THREE-DIMENSIONAL (3D) MODEL OF AN ANATOMICAL OBJECT VIA MACHINE-LEARNING," as further described in U.S. patent application Ser. No. 18/817,870, filed on Aug. 28, 2024, titled "APPARATUS AND METHODS FOR SYNTHETIZING MEDICAL IMAGES," as further described in U.S. patent application Ser. No. 18/818,152, filed on Aug. 28, 2024, titled "APPARATUS AND METHOD FOR GENERATING A THREE-DIMENSIONAL (3D) MODEL OF PATIENTS ORGAN," as further described in U.S. patent application Ser. No. 18/818,311, filed on Aug. 28, 2024, titled "APPARATUS AND METHOD FOR GENERATING A THREE-DIMENSIONAL (3D) MODEL WITH AN OVERLAY," as further described in U.S. Pat. No. 12,154, 245, filed on Apr. 26, 2024, titled "APPARATUS AND METHODS FOR VISUALIZATION WITHIN A THREE-DIMENSIONAL MODEL USING NEURAL NETWORKS," each of which is incorporated by reference herein in their entirety.

Still referring to FIG. 1, in an embodiment, probe position data 136 may include one or more movements of the ultrasound probe over time, wherein each position and orientation is correlated to a corresponding temporal element. As used herein, a "temporal element" refers to any component, factor, or aspect that is related to time. For example, temporal elements may refer to time itself, the passage of time, and/or any events and/or changes that occur and/or evolve over time. For example, a temporal element may refer to timestamps, time-based triggers, and/or any data that is indexed and/or processed with respect to time, such as real-time data, time-series data, and/or the time interval between events. In an embodiment, a temporal element may correspond to a time step, and at least a processor 108 may continuously update the position and orientation of the ultrasound probe based on real-time inputs. A "time-step," as used throughout this disclosure, refers to a fixed or variable interval of time used to update data at regular intervals. Each time-step may represent a moment in the system's real-time operation, and it may be used to guide when and how new measurements and/or updates are made. For example, in an ultrasound system, a time-step may correspond to the frame rate of the imaging system, which may dictate how frequently the system updates the position and orientation of the ultrasound probe. In an embodiment, real-time inputs may come from sensors, cameras, and/or tracking systems attached to the ultrasound probe. Additionally, and/or alternatively, these systems may be simulated in the case of a simulation. These inputs may capture the position and orientation of the ultrasound probe at each time-step. These sensors may include accelerometers, gyroscopes, magnetometers, and/or external tracking systems that provide continuous feedback about the ultrasound probe's movements relative to a reference 3D model and/or physical space. In an embodiment, at least a processor 108 may take incoming sensor data at each time-step, compute the new position and orientation of the ultrasound probe, and update the system's 100 state. This may allow system 100 to maintain an up-to-date and accurate representation of the ultrasound probe's location and movement in space. At least a processor 108 may use time-step data to calculate the ultrasound probe's new position based on its previous position and any changes detected by the sensors. Similarly, at least a processor 108 may update the ultrasound probe's orientation based on the real-time input from the sensors. If the ultrasound probe is rotated and/or tilted in any direction, at least a processor 108 may recalculate its orientation at each time-step.

With further reference to FIG. 1, in an embodiment, during an ultrasound scan, system 100 may track static probe position, as well as continuously monitoring dynamic movements, such as the ultrasound probe's shifts in space and/or rotations, along with how these movements correspond to the structures within the 3D model. These aspects may be useful in a variety of scenarios. For example, this may be useful in guiding a clinician, reconstructing detailed images, and/or improving ultrasound navigation systems. By providing real-time feedback on where the ultrasound probe is and how it relates to a 3D model, this data may help clinicians make better decisions about ultrasound placement, which may ensure more accurate scans. Further, system 100 may use the position and orientation data to create more accurate 3D visualizations, such as 3D models, of the scanned area, potentially improving diagnostic accuracy. By integrating movement and position data, system 100 may be used to create an intuitive interface that tracks the ultrasound probe's path through 3D volume, assisting in multi-planar imaging and/or visualizing the anatomy in 3D as the ultrasound probe moves.

With further reference to FIG. 1, at least a processor 108 may be configured to receive ultrasound data 128 and probe position data 136. In an embodiment, ultrasound data 128 and probe position data 136 may include real data and be received from a real ultrasonic procedure. "Real data," as used herein refers to data obtained during a procedure on a live subject. For example, data obtained from a real ultrasonic procedure. As used herein, a "real ultrasonic procedure" is an ultrasonic procedure performed on a live subject. Further, real data in comparison to simulated data, which is obtained from a simulation, is data obtained in real life procedures. In an embodiment, ultrasound data 128 and probe position data 136 may include simulated data and be received from a simulated ultrasound. For purposes of this disclosure, "simulated data" is data that is artificially generated using models or algorithms, rather than being collected from real-world observations or experiments. In some cases, wherein ultrasound data 128 and probe position data 136 are simulated data, system 100 may be used to train technicians in a simulation, prior to implementing procedures on a patient.

An "ultrasonic procedure," as used throughout this disclosure, refers to a medical diagnostic or therapeutic technique that uses high-frequency sound waves to visualize internal structures, assess organ function, or guide treatment within the body. For example, in diagnostic applications, an ultrasound probe may emit sound waves that penetrate the body, and the echoes that bounce ack are recorded and translated into images. These images may help detect abnormalities such as tumors, cysts, and/or blood flow issues. In a therapeutic application, ultrasound may be used for ultrasonic procedures such as ultrasound-guided biopsies, where the ultrasound may help precisely locate the area for sample collection, and/or in lithotripsy, where focused sound waves break up kidney stones. In an embodiment, ultrasonic images may be received from an ultrasonic procedure device. In an embodiment, ultrasonic procedures may produce ultrasonic images and may be accomplished using an ultrasonic device.

As used herein, an "ultrasonic image" is an image generated as a function of a reflection of a sound wave off of a structure. As used herein, an "ultrasonic imaging device" is a device configured to collect ultrasonic images. Non-limiting examples of ultrasonic images and/or imaging techniques include intracardiac echo (ICE) images, transthoracic echocardiograms (TTE), transesophageal echocardiograms (TEE), and point of care ultrasound (POCUS). In some embodiments, plurality of ultrasonic images may include a TEE image. In some embodiments, a TEE image may include a 2D TEE. In some embodiments, a TEE image may include a 3D TEE. In some embodiments, plurality of ultrasonic images may include an ICE image. In some embodiments, a set of ultrasonic images of the patient's organ may include an image selected from the list consisting of a transesophageal echocardiogram image, a transthoracic echocardiogram image, and a point-of-care ultrasound image. An ultrasonic image of plurality of ultrasonic images may depict an organ and/or tissue of a subject. An ultrasonic image of plurality of ultrasonic images may depict a heart, lung, spleen, liver, kidney, muscle, skeleton, intestine, stomach, vein, and/or artery. In some embodiments, an ultrasonic image may depict a heart, and/or a left atrium, left atrial appendage, left ventricle, right ventricle, and/or a right atrium of a heart.

Still referring to FIG. 1, in some embodiments, an ultrasonic image may include transesophageal echocardiogram (TEE) image. In some embodiments, a TEE image may include a view of an ostial diameter and/or length. In some embodiments, plurality of ultrasonic images may include ultrasonic images captured at the same position, and different orientations with respect to a subject's heart. In some embodiments, a TEE image may include a view of an ostial diameter and/or length from one or more angles on a mid-esophageal view. As examples, a TEE image may include a view of a subject's heart and/or an ostial diameter and/or length from 1, 2, 3, 4, 5, 6, 7, 8, 9, or 10 different angles on a mid-esophageal view. In a non-limiting example, a TEE image may include a view of a subject's heart and/or an ostial diameter and/or length from 4 different angles (0°, 45°, 90°, 135°) on a mid-esophageal view. In some embodiments, angles of images may describe a rotational position of an ultrasound transducer 124 relative to a subject's heart. In additional non-limiting examples, a TEE image may include a view of a subject's heart and/or an ostial diameter and/or length from 0° (which may provide a four chamber view), 45-60° (which may provide a two chamber view and in some embodiments may be used to identify a thrombus), 90° (which may provide a long-axis view), 120-135° (which may provide a long-axis view of a left atrial appendage) and/or 135-160° (which may provide an aortic valve long axis view) on a mid-esophageal view. In some embodiments, an ostial diameter and/or length includes an ostial diameter and/or length of a left atrial appendage (LAA) of a heart and/or another location at which a cardiac implant may be placed. In some embodiments, TEE images may include a view of an ostial diameter and/or length from 4 different angles, such as, as a non-limiting example, 0°, 45°, 90°, and 135°. TEE imaging is discussed further with respect to FIG. 5.

Still referring to FIG. 1, in some embodiments, plurality of ultrasonic images may include an intracardiac echocardiography (ICE) image. As used herein, an "ICE image" is an ultrasound image obtained from within the heart's chambers or blood vessels. In some cases, ICE images may be captured using a specialized catheter 120 equipped with an ultrasound transducer 124 that is inserted into the body and guided to the heart of subject. In an embodiment, an ultrasound image may provide a detailed and real-time visualization of cardiac anatomy. ICE images may also include internal structures, functions, and blood flow patterns of the heart of a subject. Plurality of ultrasonic images may be related in terms of content, time of capture, sequence, or any other relevant parameters described herein. In a non-limiting example, each image of plurality of ultrasonic images may represent a particular view, angle, or perspective of an object, subject, or scene, and may be in two-dimensional (2D) or 3D format. Images of plurality of ultrasonic images may include, without limitation, any two-dimensional or three-dimensional images of any anatomy or anatomical structure, including without limitation images of any internal organ, tissue including muscular, connective tissue, epithelial tissue, and/or nervous tissue, bone, and/or any other element that may be imaged within a human and/or animal body.

Still referring to FIG. 1, in a non-limiting example, structures of a heart of a subject which may be imaged may include chambers (e.g., four chambers including left and right atria and left and right ventricles), valves (i.e., the structures that regulate blood flow between chambers and vessels, including mitral, tricuspid, aortic, and pulmonary valves), vessels (e.g., aorta, pulmonary arteries and veins, and coronary arteries), conduction system (i.e., a network of specialized cells that control the heart's electrical activity and rhythm), muscular and connective tissues (e.g., heart's muscular walls, septa, any other connective tissues that provide structural integrity and enable contraction), LAA and other appendages, pathological features (e.g., any abnormalities, defects, and/or the like), and/or other components of a heart.

Still referring to FIG. 1, in an embodiment, each ultrasonic image of plurality of ultrasonic images may include a particular view of subject's heart chambers, valves, vessels, and/or the like. In a non-limiting example, plurality of ultrasonic images may include multiple views e.g., different angles and perspectives of a subject's heart. In another embodiment, plurality of ultrasonic images may be arranged in a temporal sequence. In a non-limiting example, plurality of ultrasonic images may include a series of images captured overtime, allowing for an observation of dynamic cardiac functions such as beating, blood flow, and/or the like. In some cases, each ultrasonic image of plurality of ultrasonic images may include a corresponding timestamp, wherein the timestamp may include an indicator showing a date and time of when the corresponding ultrasonic image was taken.

Still referring to FIG. 1, in some embodiments, plurality of ultrasonic images may be received from an electronic health record database. For example, plurality of ultrasonic images may be collected at a first point in time, stored in an electronic health record database, and later used in further steps of a process described herein.

With continued reference to FIG. 1, at least a processor 108 may be configured to generate, using a trained sweep trajectory simulation model 140, a movement vector 144 as a function of the ultrasound data 128 and the probe position data 136. As used herein, a "sweep trajectory" refers to the path or movement pattern followed by an imaging probe or device during a scanning procedure. For example, a scanning procedure may include ultrasound, where the probe moves across and/or around the area of interest to gather data. The sweep trajectory may ensure that the device covers a broad area, enabling the collection of detailed data that can be used to create 2D and/or 3D visualizations of internal structures. In medical imaging different sweep trajectories may be chosen based on the anatomical area being studied, such as the heart, liver, and/or fetus, and the type of information needed, such as tissue density, blood flow, and/or organ motion. In an embodiment, training trained sweep trajectory simulation model 140 may be consistent with one or more aspects of the systems and methods of training sweep trajectory simulation model as described in U.S. patent application Ser. No. 19/188,841, filed on Apr. 24, 2025, titled "SYSTEM AND METHOD FOR SWEEP TRAJECTORY SIMULATION," which is incorporated by reference herein in its entirety.

In further reference to FIG. 1, for purposes of this disclosure, a "movement vector" is a mathematical representation that describes a projected or suggested change in position or orientation of an object or point in space. In some cases, this may include the change in position of an object or point in space over a given period of time. In an embodiment, a movement vector 144 may include both direction and magnitude. Wherein the movement vector 144 points in the direction of movement, and the length of the vector represents the distance the object has moved, or the magnitude of the movement. In a 2D space, a movement vector 144 may be represented with (x, y) coordinates. Whereas in 3D space a movement vector 144 may be represented with (x, y, z) coordinates. In an embodiment, at least a processor 108 may generate a movement vector 144 as a function of the ultrasound data 128 and probe position data 136 by comparing ultrasound data 128 and probe position data 136 at a first time and ultrasound data 128 and probe position data 136 at a second time. For example, if ultrasound data 128 and probe position data 136 indicate that the catheter 120 has moved from position A (1, 2) to position B (4, 6) the movement vector 144 would be v=(4−1, 6−2)=(3, 4). This would indicate that the catheter 120 moved 3 units in the x-direction and 4 units in the y-direction.

Further referencing FIG. 1, in an embodiment, trained sweep trajectory simulation model 140 may include a reinforcement learning model trained using computed tomography (CT) data. For purposes of this disclosure, "CT data," refers to the information generated by a CT scan. A "CT scan," as used herein is a medical imaging technique that uses X-rays and computer processing to create detailed cross-sectional images of the body. A "reinforcement learning model," as used throughout this disclosure, is a machine-learning model where an agent learns to make decisions by interacting with an environment in order to maximize some notion of cumulative reward over time. The agent may take actions, receive feedback in the form of rewards and/or penalties, and adjust its behavior over time to maximize cumulative rewards. Key components of reinforcement learning may include the agent, environment, state, action, reward, policy, and/or value function. In reinforcement learning, an "agent," is the decision-maker that preforms actions in the environment. The "environment," as used herein, refers to the system with which the agent interacts. A "state," as used herein, is a representation of the environment at a given time. "Action," as used herein, refers to the choices the agent can make to affect the environment. As used herein, "reward" refers to the feedback the agent receives after taking an action, indicating how good or how bad that action was. A "policy," as used herein, is a strategy or mapping from states to actions that the agent follows to decide what actions to take. As used herein, a "value function" is a measure of the long-term reward an agent can expect from a given state, guiding the agent's decision making. In an embodiment, a reinforcement learning (RL) model may aim to find an optimal policy that maximizes the total expected reward over time, in some cases using techniques such as Q-learning, deep Q networks (DQN), and/or policy gradient methods.

In further reference to FIG. 1, in an embodiment, the RL agent may be the sweep trajectory simulation model. The environment may include CT data and/or 3D anatomical data. The state may be represented by the position of a catheter 120 at any given point in the procedure, as well as surrounding tissue structures derived from the probe position data 136 and 3D models. The actions may include potential movements and/or changes in a catheter's 120 trajectory. RL model may decide on the best action, such as direction, angle, and/or path, which the catheter 120 should take based on a current state. The reward may include a signal given to the agent based on the success of its action. For example, a positive reward may be given for actions that move the catheter 120 closer to the target area while avoiding obstacles and/or scans that provide a thorough view. For purposes of this disclosure, a "target area" refers to an area, path, or location that correlates with an optimal sweep trajectory. Alternatively, negative rewards may be assigned when the catheter 120 comes too close to obstacles and/or deviates from the optimal path, which could reduce the success of the procedure. The policy may include the strategy that the RL agent learns to determine the best sequence of actions to reach the target area while avoiding obstacles. In an embodiment, the optimal trajectory may be the policy that maximizes the cumulative reward, meaning it leads to the most successful catheter 120 sweeps in the fewest steps. During training, the sweep trajectory simulation model may interact with the environment. Over time, through trial and error, the sweep trajectory simulation model may learn which actions lead to successful catheter 120 sweeps. Further, the sweep trajectory simulation model may use the training data, which may include CT data, 3D imaging, probe position data 136, and 3D models to learn patterns and optimize its trajectory. The training may involve optimizing the sweep trajectory simulation model to find the best trajectory for each procedural scenario, potentially factoring in the number of sweeps needed to achieve an accurate 3D model and/or successful procedure using CT data captured from a CT scan and/or retrieved from a database.

In continued reference to FIG. 1, in an embodiment, system 100 may further include a 3D model generator 166 configured to generate a 3D model of a target region using the ultrasound data 128 and trained sweep trajectory simulation model 140 may be further configured display, at user interface 164, the catheter 120 position in relation to the 3D model as a function of the probe position data 136. A "3D model," as used throughout this disclosure, is a digital representation of an object or structure in three-dimensional space. 3D models may include, without limitation, vertices, edges and faces, meshes, textures and materials, rendering, animation and rigging, and/or the like. For purposes of this disclosure, a "target region" refers to a specific area or location that is the focus of interest or action in a particular context. In an embodiment, the target region may be related to a system and/or specific organ, such as a heart. For example, the target region may be specific to the ultrasonic procedure being undergone. In a non-limiting embodiment, 3D model generator 166 may generate 3D models as described above in reference to generating 3D models, which may include any incorporations by reference.

In further reference to FIG. 1, in a non-limiting example, 3D model may include a 3D voxel occupancy representation (VOR). As used in this disclosure, a "3D voxel occupancy representation (VOR)" of anatomy is a 3D digital representation of a spatial structure of the anatomy, wherein the representation is composed of a plurality of discrete volumetric elements known as voxels. A "voxel," for the purpose of this disclosure, is a 3D equivalent of a pixel in 2D imaging. While a pixel represents a point in a 2D image and may include properties such as color and/or brightness, a voxel may represent a volume in a 3D space and may include additional properties such density/occupancy as described below. In an embodiment, each voxel of plurality of voxels within 3D VOR may represent a specific portion of a heart. In some cases, voxel may be a smallest distinguishable box-shaped part (i.e., 1 px·1 px·1 px) of a three-dimensional image. In some cases, each voxel of plurality of voxels within VOR may be represented as a cube or rectangular prism (although other shapes may be used in specialized applications). Each voxel may include a size that determines a resolution of the 3D image or model. In an embodiment, smaller voxels may provide higher resolution; however, it may require more computational resources (e.g., RAM) for at least a processor 108 to process.

Still referring to FIG. 1, each voxel of plurality of voxels within VOR may include one or more embedded values. As used herein, "embedded values" refers to specific numerical or categorical data associated with each voxel. In some cases, embedded values may represent various attributes or characteristics of the corresponding portion of structure that voxel represents. In a non-limiting example, embedded values may include density values, intensity values, texture information, or any other quantitative measures that provide insights into the underlying tissue. Such embedded values may be derived from set of ultrasonic images or other imaging modalities used to generate data structure. In some cases, embedded values may be utilized, by at least a processor 108, to differentiate between different types of tissues, such as myocardial tissue, blood vessels, or chambers. Embedded values may also facilitate the visualization of dynamic cardiac functions, for example, and without limitation, blood flow or heart beating by encoding temporal information such as timestamps within plurality of voxels.

Still referring to FIG. 1, in an embodiment, each voxel of plurality of voxels may include a presence indicator. As used in this disclosure, a "presence indicator" refers to a data element that indicates a presence or absence (i.e., occupancy) of tissue within that portion. In some cases, and without limitation, presence indicator may include an occupancy status as one of the embedded values described herein. Portion may include a specific location within 3D space where data structure is generated; for instance, and without limitation, a coordinate in 3D space represented in a tuple such as (x, y, z). In an embodiment, 3D VOR may provide a spatial framework that allows for the modeling and visualization of structure in 3D space. In some cases, 3D model may include a plurality of layers or slices (either horizontal [e.g., xy plane] or vertical [e.g., xz or yz plane depends on the view direction]), wherein each layer or slices of the plurality of layers or slices is corresponding to a different cross-sectional view of a structure of subject, and collectively forming a comprehensive 3D depiction of the structure. In a non-limiting example, 3D VOR having plurality of voxels with presence indicators may indicate whether each voxel in 3D space may be occupied by a part of a structure of subject. A binary value such as 0 or 1 may be configured as presence indicator to show either a pixel of 3D space is occupied (e.g., 1) or empty (e.g., 0). In should be noted that other values may be used as presence indicator such as a Boolean value e.g., TRUE or FALSE.

Still referring to FIG. 1, one or more embedded values, such as, without limitations, occupancy, or density, may be derived from plurality of ultrasonic images described herein by at least a processor 108. In a non-limiting example, determining occupancy status of each voxel of plurality of voxels may include converting set of ultrasonic images to a set of binary images and determining occupancy status of each voxel as a function of the structure of interest's binary value. In some cases, occupancy status may include a value representing the likelihood of occupancy of the corresponding tissue. In another non-limiting example, density may be calculated, by at least a processor 108, for each voxel as a function of the echogenicity of one or more pixels on a given ultrasonic image, wherein, the brightness of the given ultrasonic image may be analyzed since different tissues reflect ultrasound waves differently.

Still referring to FIG. 1, generating 3D model of a subject's organ may include generating a 3D array. In some cases, at least a processor 108 may divide 3D space into a grid of plurality of voxels, each with specific x, y, and z coordinates as embedded values. Each element of 3D array may correspond to a voxel. In some cases, 3D array may allow for easy access and manipulation of plurality of voxels, enabling various analyses, visualizations, and transformations either described or not described herein. In a non-limiting example, embedded values may include a density of the tissue at a specific location of a patient's body derived from one or more ultrasonic images of plurality of ultrasonic images.

Still referring to FIG. 1, 3D model of structure may include a 3D grid configured to map presence indicators and/or other embedded values described herein of plurality of voxels (e.g., tissue density, blood flow velocity, echogenicity or acoustic properties, and any other biophysical properties). As used in this disclosure, a "3D grid" refers to a 3D model that divides a given volume (e.g., volume of a structure) into a plurality of discrete units called cells (i.e., volume elements). In an embodiment, each cell within 3D grid may be associated with a distinct voxel. Mapping presence indicators or other embedded values may include assigning each presence indicator or embedded value to each point within 3D grid such as corners of each corresponding cell. Such values may be derived from plurality of ultrasonic images as described above.

Still referring to FIG. 1, cells may be continuous, meaning that one or more cells may represent one or more continuous regions of space rather than discreate, separate units. In a non-limiting example, instead of being uniform, mapped presence indicator and/or other embedded values may vary continuously across different cells or cell's volume. In such an embodiment, at least a processor 108 may use interpolation to estimate other (unknown) embedded values within a range based on existing values such as known embedded values at specific points, thereby allowing for smooth transitions between cells. Exemplary interpolation methods may include, without limitation, linear interpolation, cubic interpolation, and/or the like. For example, and without limitation, if the corners of a cell have known values interpolation can be used to estimate the values at any point within the cell based on those corner values.

Still referring to FIG. 1, 3D model of an organ may include a 3D grid having a plurality of cells e.g., voxels, wherein each cell may contain a continuous range of values representing tissue density, blood flow velocity, or other properties (i.e., embedded values). At least a processor 108 may be configured to apply trilinear or tricubic interpolation to estimate tissue density within each cell based on presence indicator or other known values at the cell's boundaries, since tissue densities change gradually; Such 3D grid may provide a smooth, continuous representation of heat's internal structures, allowing for more nuanced analysis and visualization as described below. In a further embodiment, 3D grid with continuous cells may be additionally used in fluid dynamics simulations.

Still referring to FIG. 1, presence indicators and/or other embedded values may be mapped to a 3D grid as a function of array masking. In a non-limiting example, at least a processor 108 may generate a mask e.g., a binary array that defines which voxels or cells are affected. Mask may be used to select or modify specific voxels or cells based on certain attributes; for instance, and without limitation, at least a processor 108 may use a mask to isolate the LA within the heart focusing the analysis on that specific region. Such mask may include criteria defined by specific density thresholds that distinguish the LA's tissue (i.e., voxels representing LA in 3D grid) from surrounding structures (i.e., neighboring voxels). In some cases, such mask may further include a binary mask, wherein each voxel in the 3D grid may be assigned a first presence indicator such as 1 if the voxel meets the criteria for the LA and a second presence indicator such as 0 if it does not. In some embodiments, mask may be directly applied to 3D grid, selecting, or modifying voxels or cells, thereby enabling at least a processor 108 to highlight, exclude, or otherwise manipulate specific parts of a heart within 3D grid. At least a processor 108 may then perform an element-wise multiplication between 3D grid and the mask. Continuing from the previous non-limiting example, voxels corresponding to the LA (wherein the mask value is 1) may retain their original values, while other voxels (where the mask value is 0) may be set to 0 or other specific value (i.e., excluded or masked out).

Still referring to FIG. 1, in some embodiments, 3D grid may include one or more spatial features extracted from plurality of ultrasonic images. As used in this disclosure, "spatial features" are specific characteristics or attributes related to the spatial arrangement, shape, size, texture, or orientation of structures within a 3D space. In some cases, spatial features may include one or more embedded values described herein and their combinations thereof. In a non-limiting example, spatial features may be represented numerically as a vector, a metric or other mathematical constructs that capture specific spatial characteristics. In some cases, spatial features may also be visualized as contours, surfaces, or other geometric representations. In an embodiment, spatial features may be extracted using edge detection, texture analysis, or other image processing techniques (e.g., cleaning and enhancing images, image segmentation, and/or the like). In another embodiment, one or more machine learning models, such as convolutional neural networks (CNNs) as described in further detail below, may be used to extract complex spatial features.

Still referring to FIG. 1, in a non-limiting example, one or more spatial features may include one or more shape features (i.e., characteristics related to the shape of specific structures), such as curvature, surface area, volume, and/or the like. In another non-limiting example, one or more spatial features may include one or more texture features (i.e., characteristics related to the texture or pattern within tissues, as seen in plurality of ultrasonic images), such as gray-level co-occurrence matrix (GLCM) features representing the texture of heart muscle tissue. In another non-limiting example, one or more spatial features may include one or more orientation features (i.e., characteristics related to the orientation or alignment of structures), such as the angle or alignment of the septum within the heart. In a further non-limiting example, one or more spatial features may include one or more edge and boundary features (i.e., Characteristics related to the edges or boundaries between different structures), such as edge detection features highlighting the boundary between the myocardium and the cardiac chambers. As an ordinary person skilled in the art, upon reviewing the entirety of this disclosure, will be aware of various spatial features extracted from plurality of ultrasonic images consistent with this disclosure.

In further reference to FIG. 1, in an embodiment, at least a processor 108 may display, at user interface 164, the catheter 120 position in relation to the 3D model as a function of the probe position data 136. For purposes of this disclosure, a "user interface" is a means through which a user and a computer system interact. The goal of a UI is to allow a user to effectively control and interact with a system, software application and/or device. In one or more embodiments, user interface 164 may include a graphical user interface (GUI) 172. A "GUI," as used herein, is a visual interface that allows users to interact with electronic devices through graphical elements rather than text-based commands. Features of a GUI 172 may include, but are not limited to windows, icons, menus, buttons, sliders and controls, and/or any other graphical content configured to assist a user in interacting with an electronic device. As used in this context, "manipulation" refers to actions or interactions a user may perform to modify, control, or navigate through an interface. Such manipulations may require the use of input devices such as, but not limited to mouses, keyboards, and/or touchscreens. For example, manipulations may include clicking, dragging, scrolling, resizing, zooming, hovering, right-clicking, keyboard shortcuts, inputting data, removing data, and/or modifying data.

In continued reference to FIG. 1, in an embodiment, GUI 172 may include one or more event handlers. As used throughout this disclosure, "event handler" refers to functions or methods designed to respond to specific events in a program, particularly in user interface contexts. An "event" is an occurrence that is detected by the program. For example, this may include a mouse click, keyboard input, and/or a change in a form field. In an embodiment, event handlers may include a listener and or binding process. A listener is a function that listens for specific events on an element. For instance, a button or an input field. A binding process is the process of associating an event with its handler. When an event occurs, an event object may be passed to the handler, containing details about the event. Event handlers allow for interactivity, modularity, and reusability. In such that, event handlers enable applications to respond dynamically to user actions, organize code by separating event handling logic from other program logic, and the same handler may be used for multiple elements and/or events. Further, in an embodiment, the feedback from an event handler may be utilized as training data in the training or retraining of models and/or modules as described here within.

Continuing to reference FIG. 1, in an embodiment, GUI 172 may be displayed at a display device 168. As used herein, a "display device" refers to an electronic device that visually presents information to the entity. In some cases, display device 168 may be configured to project or show visual content generated by computers, video devices, or other electronic mechanisms. In some cases, display device 168 may include a liquid crystal display (LCD), a cathode ray tube (CRT), a plasma display, a light emitting diode (LED) display, and any combinations thereof. In a non-limiting example, one or more display devices 168 may vary in size, resolution, technology, and functionality. Display device 168 may be able to show any data elements and/or visual elements in various formats such as, textural, graphical, video among others, in either monochrome or color. Display device 168 may include, but is not limited to, a smartphone, tablet, laptop, monitor, tablet, and the like. Display device 168 may include a separate device that includes a transparent screen configured to display computer generated images and/or information. In some cases, display device 168 may be configured to present a GU 1172 to a user, wherein a user may interact with the GUI. In some embodiments, GU 1172 may be updated based on user inputs and/or movements of catheter 120.

Still referring to FIG. 1, at least a processor 108 may be configured to determine, using movement vector 144, real-time guidance data 148. As used throughout this disclosure, "real-time guidance data" refers to information or instructions that are provided continuously or instantaneously to assist in decision-making or navigation in an ultrasonic procedure. Real-time guidance data 148 may assist a user in accurately performing a sweep and ensure proper alignment, positioning, and/or coverage of the target area. In an embodiment, real-time guidance data 148 may indicate an optimal movement of a catheter 120 as predicted by trained sweep trajectory simulation model 140. For purposes of this disclosure, an "optimal movement" refers to the most efficient, effective, or safe way to perform a movement. An optimal movement may be aligned with optimized sweep trajectory based on historic sweep trajectory data. Further, in an embodiment, real-time guidance data 148 may include one or more of: visual feedback 152, auditory feedback 156 and/or haptic feedback 160. As used herein, "visual feedback" refers to information received through one's sense of sight to help guide, adjust, or improve one's movements or interactions. In an embodiment, visual feedback 152 may include path or trajectory overlays, color-coded feedback, grid or overlay patterns, real-time positioning feedback, distance or coverage indicators, feedback for depth control, real-time image or slice views, warning indicators, and/or user interface 164 controls. "Auditory feedback," as used throughout this disclosure, refers to information received through one's sense of hearing that helps guide, adjust, or improve one's movements or interactions. In an embodiment, auditory feedback 156 may include beep or tone for positioning, continuous feedback for sweep progress, including a progressive beep or tone and/or continuous sound for an active area, volume and tone variations for signal quality, directional feedback, alert sounds for system warnings, confirmation sounds for completed tasks, interactive sounds for user engagement, and/or the like. For purposes of this disclosure, "haptic feedback" refers to information received through one's sense of touch or tactile sensation to provide guidance that helps adjust or improve one's movements or interactions. In an embodiment, haptic feedback 160 may include vibration for positioning and alignment, vibration for depth control, vibrations aligning with sweep progress, obstacle detection and contact feedback, guidance for movement, error or alert signals, probing for consistency and quality, and/or the like. In one or more embodiments, one or more of these exemplary feedback mechanisms may be used in parallel.

With further reference to FIG. 1, in an embodiment, real-time guidance data 148 may include visual feedback 152, wherein visual feedback 152 includes an on-screen visual guide, and the display device 168 is configured to display the visual feedback 152 to a user as a function of real-time guidance data 148. As used herein, an "on-screen visual guide" is a graphic or set of visual instructions displayed on a screen to assist a user in completing a task or understanding a concept. For example, an on-screen visual guide may include arrows, highlighted areas, step-by-step instructions, diagrams, and/or other cues that guide the user through a process or action. In an embodiment, an on-screen visual guide may include path or trajectory overlays, which may include a guiding line or curve and/or one or more arrow indicators. For example, an on-screen visual guide may include a real-time, semi-transparent line or curve that appears on UI, overlaying the 3D model, showing the ideal trajectory or path the ultrasound probe should follow. Further, in some cases, arrows and/or other markers may guide a user on where to move the ultrasound probe, indicating the direction of the next sweep, and ensuring that the trajectory is followed correctly. In some cases, an on-screen visual guide may include a heatmap visualization. This may include, for example, a color gradient, which may be used to indicate the quality or intensity of the ultrasound signal along the sweep path. For example, green may represent an optimal signal strength, whereas yellow may indicate areas where the signal is weak, or the ultrasound probe is misaligned. Further, in some cases, a region of interest may be highlighted in a specific color in order to guide a user towards the optimal area, focusing the ultrasound sweep. In an embodiment, an on-screen guide may include grid or overlay patterns. For example, a grid overlay may be displayed at display device 168 on user interface 164 to guide a user's sweep through the target area with precise positioning. These grids may aid a user in maintaining consistent distance and/or alignment between adjacent ultrasound scans. Further, in some cases, an on-screen guide may display a circular or sector-shaped indicator to show the exact area that requires coverage during a sweep. In one or more embodiments, real-time positioning feedback may be integrated into an on-screen guide. This may include probe position indicators and/or angle and orientation displays. For example, visual markers may show the current position and/or angle of the ultrasound probe, such as a crosshair or a dot that tracks the probe's location in real-time. Further, in some cases, a graphical display of the ultrasound probe's angle relative to the body surface may be shown to ensure that the sweep is being performed at the correct angle for optimal imaging.

With further reference to FIG. 1, in an embodiment, real-time guidance data 148 may include a set of visual indicators, wherein the set of visual indicators show a relative proximity of a catheter 120 to a target area. Further, at least a processor 108 may be further configured to update the set of visual indicators based on one or more movements of a catheter 120. In one embodiment, real-time guidance data 148 may be presented through a set of visual indicators designed to display the relative proximity of a catheter 120 to a target area within a patient's body. These visual indicators may be dynamic, updating continuously as the catheter 120 moves, offering immediate feedback to a clinician regarding the catheter's 120 position and orientation relative to the target area, such as a specific organ, blood vessel, or anatomical feature. In an embodiment, the visual indicators may take various forms, such as color-coded graphics, proximity bars, and/or directional arrows, each indicating how close or far the catheter 120 is from the desired target area. For instance, the system might use a color gradient, with green indicating optimal proximity, yellow for moderate proximity, and red for positions requiring further adjustment. Additionally, the system could employ a graphical map or 3D model of the anatomy to represent the catheter's 120 movements and the corresponding location of the target area in real-time. A target area in this instance may include an optimal sweep trajectory and/or target points along an optimal sweep trajectory.

In continued reference to FIG. 1, in an embodiment, at least a processor 108 may be responsible for continuously updating the set of visual indicators as the catheter 120 moves. For example, at least a processor 108 may integrate data from ultrasound data 128 and probe position data 136, to track the catheter's 120 position and orientation within the body. At least a processor 108 may analyze the catheter's 120 movement data, adjusting the visual indicators accordingly to reflect real-time changes in the catheter's 120 location. This ensures that clinicians receive up-to-date guidance, which may be crucial for making precise adjustments during procedures such as catheter insertion, ablation, or biopsy.

Still referring to FIG. 1, in an embodiment, real-time guidance data 148 may include a performance metric, wherein the performance metric evaluates a user's progress in achieving an optimal catheter 120 movement and the performance metric is displayed, at display device 168, in real-time. In an embodiment, the performance metric may be determined as a function of comparing a user's actions against an optimal movement as predicted by trained sweep trajectory simulation model 140. In some cases, at least a processor 108 may also be programmed to take into account additional factors such as the catheter's 120 velocity or direction of movement, adjusting the rate at which visual indicators update to ensure the feedback is clear and easy to interpret. Furthermore, system 100 may include features such as predictive guidance, where the visual indicators show not only the current position but also the anticipated trajectory of the catheter 120 based on its current path and speed.

With continued reference to FIG. 1, in an embodiment, at least a processor 108 may be further configured to continuously update real-time guidance data 148 based on changes in ultrasound data 128 and probe position data 136. This configuration allows system 100 to offer dynamic and highly accurate feedback as the catheter 120 is guided through the patient's body, adapting in real time to both changes in the internal anatomy and changes in the position of the ultrasound probe itself. At least a processor 108 may continuously analyze ultrasound data 128 to detect any changes in the patient's internal environment as the catheter 120 moves. This may include the relative movement of tissues, the identification of new structures as the catheter 120 approaches, and any alterations in tissue density or organ shape. By processing the ultrasound data 128, at least a processor 108 may generate and/or update a 2D or 3D representation of the region of interest, keeping the guidance data aligned with the actual tissue positioning. For example, if the catheter 120 is approaching an organ, tumor, or blood vessel, the ultrasound data 128 can dynamically update to show the proximity of the catheter 120 to these structures. As the tissues within the region shift, or as the catheter 120 enters new areas, at least a processor 108 may update the visualization in real time, providing clinicians with immediate, actionable feedback. Additionally, by leveraging features like Doppler ultrasound, at least a processor 108 may also detect blood flow dynamics and incorporate this data into the guidance system, alerting the clinician if the catheter 120 is near a vessel or at risk of puncturing it.

Still referring to FIG. 1, in an embodiment, at least a processor 108 may continuously update the real-time guidance by merging the ultrasound data 128 and probe position data 136 to update the displayed guidance information, providing a seamless, integrated view of both the catheter's 120 location and the internal anatomical structures. This may include updating visual indicators, such as proximity alerts, overlays, or 3D models of the patient's anatomy, to reflect any changes in position or orientation based on the newly processed data.

In continued reference to FIG. 1, in an embodiment, at least a processor 108 may be further configured to display, through user interface 164, ultrasound data 128 as an ultrasound image, and overlay, on the ultrasound image at the user interface 164, real-time guidance data 148, wherein the real-time guidance data 148 includes visual feedback 152 configured to direct a user in real-time to adjust a catheter's 120 position. As used in this disclosure, an "ultrasound image" is a visual representation generated by reflection of high-frequency sound waves off internal body structures. In an embodiment, the visual feedback 152 may be accompanied by other feedback, such as auditory and/or haptic feedback 160.

Figure 2:
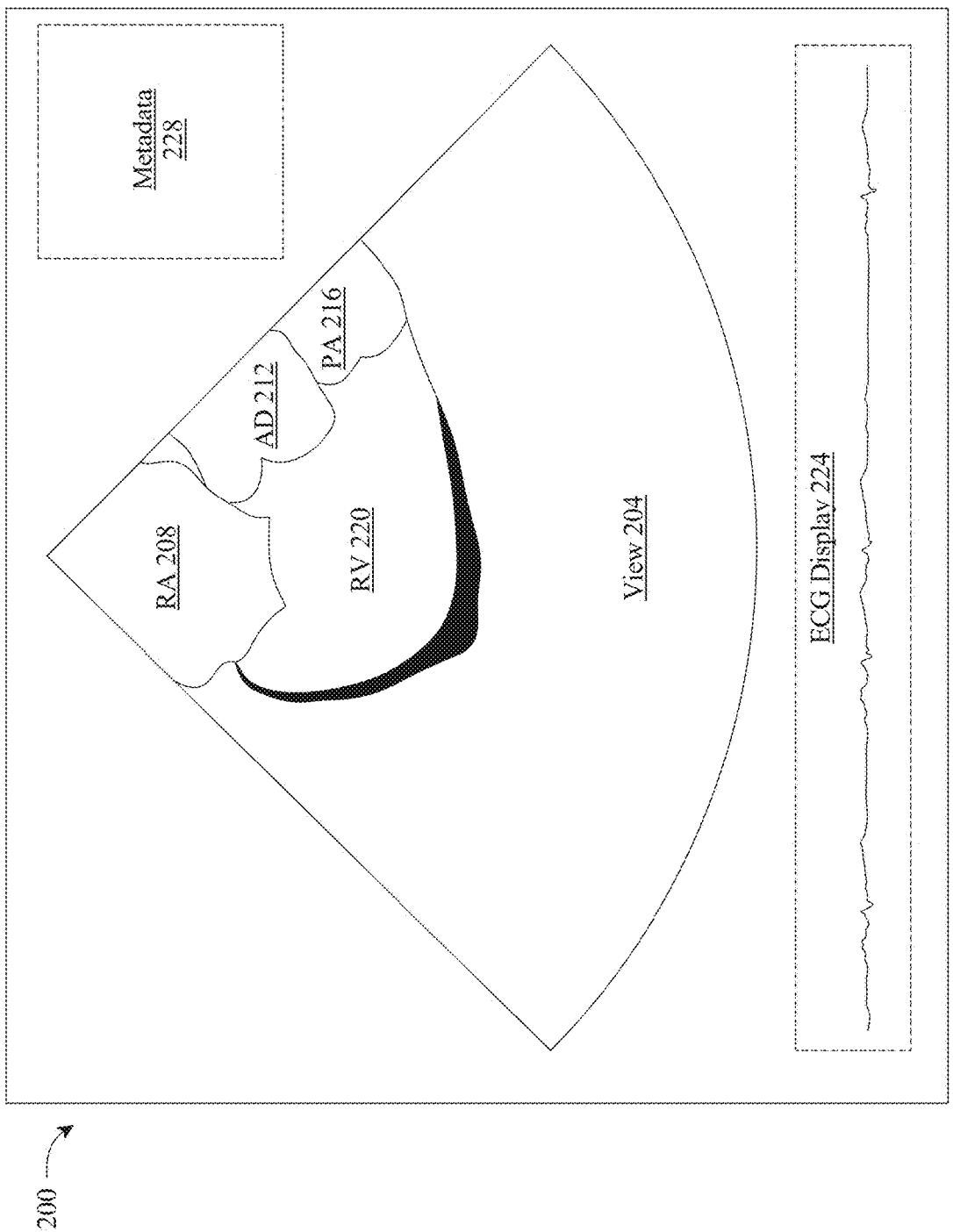
FIG. 2 shows an exemplary embodiment of an intracardiac echocardiography (ICE) image.

Now referring to FIG. 2, an exemplary embodiment of an ultrasonic image such as ICE image 200 is illustrated. As described above with reference to FIG. 1, plurality of ultrasonic images may include a plurality of ICE images, wherein each ICE image of the plurality of ICE images is a specialized form of echocardiography that may provide detailed image of heart's interior structures. In a non-limiting example, plurality of ICE images may include an ICE video (e.g., plurality of ICE images arranged in a corresponding time sequence). In an embodiment, ICE image 200 may be real-time, dynamic ultrasound image that provide a (detailed) view 204 of heart's interior structures, including, without limitation, right atrium (RA) 208, anterior descending (AD) 212, pulmonary atresia (PA) 216, and right ventricular (RV) 220.

With continued reference to FIG. 2, in some cases, ICE image 200 may include gray scaled image. It should be noted that, in some cases, ICE image 200 may be configured to visualize blood flow and/or blood flow patterns within the heart via color doppler. In some cases, resolution and/or clarity of ICE image 200 as described herein may be superior to transthoracic or transesophageal echocardiography due to the ICE catheter may be positioned inside the heart, closer to the structures being imaged.

Still referring to FIG. 2, in a non-limiting example, heart chambers may appear as dark, anechoic (black) areas since they are filled with blood, which doesn't reflect ultrasound waves well. Heart walls, valves, and/or other structures may appear as varying shades of gray, depending on their density and composition, in some cases, Color Doppler overlays may show blood flow in different colors, indicating the direction and speed of blood flow. For instance, and without limitation, red may indicate flow towards the probe, while blue may indicate flow away from the probe.

With continued reference to FIG. 2, in a non-limiting embodiment, ICE image 200 may be synchronized with ECG data, allowing for precise timing of cardiac events with anatomical visualization provided by ICE. In some cases, ICE image 200 may include an ECG display 224 configured to display ECG waveform as a continuous line graph at the top, bottom, or side of ICE image 200. In some cases, specific parts of the cardiac cycle e.g., systole or diastole, may be correlated with visual data from ICE image 200.

Additionally, or alternatively, and still referring to FIG. 2, ICE image 200 may come with accompanying metadata 228 displayed on the side or corners of ICE image 200 as described herein. In some cases, metadata 228 may provide essential contextual information about ICE image 200 and/or the corresponding patient. In a non-limiting example, metadata 228 may include patient information (e.g., patient ID, name, DOB, age, gender, and the like), image acquisition details (e.g., date and time, probe type, frequency, depth, gain, and the like), procedure-related information (e.g., procedure name, operator, location, and the like), ECG trace (e.g., ECG data as described above), measurement annotations (e.g., any measurements taken directly on the image e.g., diameter, a value of thickness of a heart wall and the like), image sequence information (e.g., image number, total number of frames, and the like), comments or notes, hospital or clinic information, and/or the like. As an ordinary person skilled in the art, upon reviewing the entirety of this disclosure, will be aware of ICE image 200 and various components thereof may be incorporated by system 100 for generating 3D model of cardiac anatomy.

Figure 3:
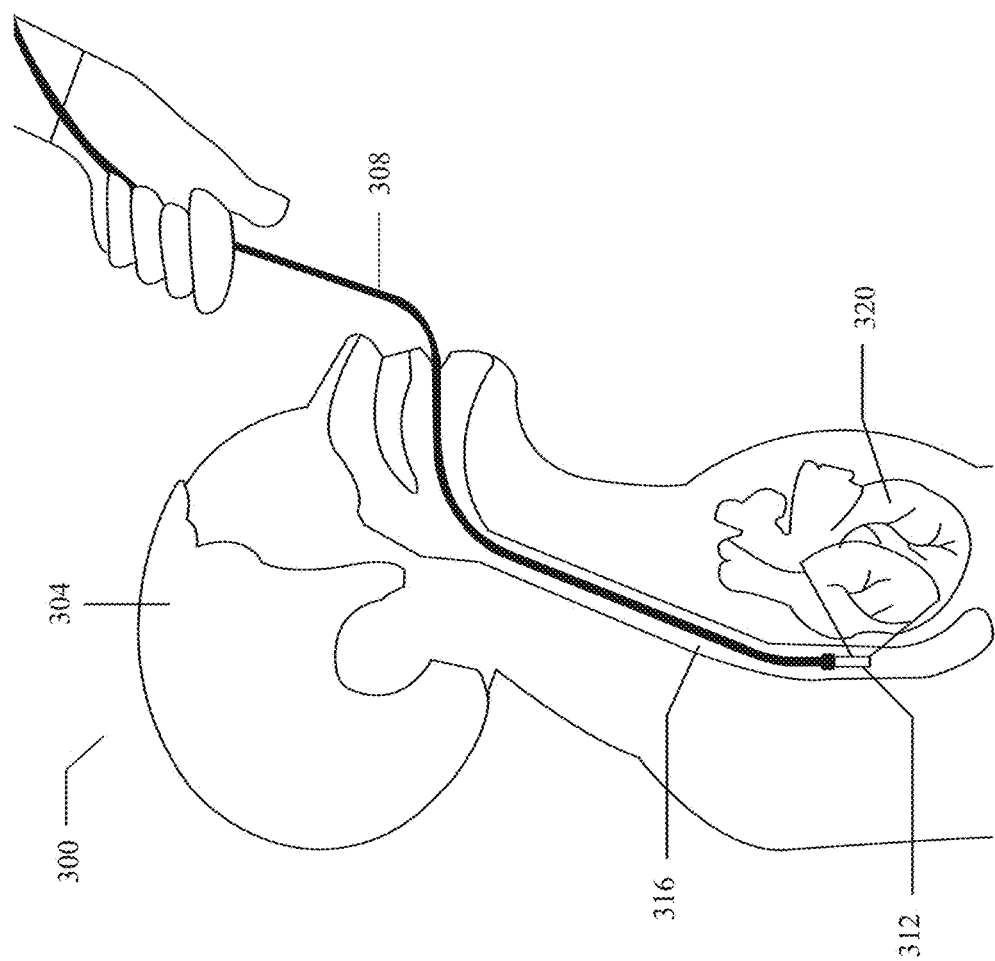
FIG. 3 is a schematic diagram of an exemplary transesophageal echocardiogram (TEE)

Now referring to FIG. 3, a schematic of an exemplary transesophageal echocardiogram (TEE) procedure 300 is shown. In some cases, TEE 300 may be performed during another procedure for instance heart surgery. According to some embodiments, a patient 304 has an endoscope 308, with an ultrasonic transducer 312, inserted into his esophagus 316. As one's esophagus 316 is proximal one's heart 320, ultrasonic transducer 312 may generate echocardiograms.

Still referring to FIG. 3, in some embodiments, transesophageal echocardiography (TEE) may provide superior imaging quality than intracardiac echocardiography (ICE), as larger ultrasound transducers 312 may be placed within the esophagus 316 than within heart 320. In some cases, ultrasound transducers must be substantially miniaturized to fit within heart 320, as in ICE catheters. As esophagus 316 may be proximal to heart 320, TEE may provide a clear image of various heart structures without needing vascular access (as commonly required by ICE). Additionally, TEE may be performed without obstructing patient's 304 ribcage and intermediary tissues (as commonly required by transthoracic echocardiography [TTE]). In some cases, TEE images may also provide information associated with angle of acquisition. Angle of acquisition may bean angle of TEE probe with respect to esophagus 316 (e.g., esophageal axis).

Figure 5:
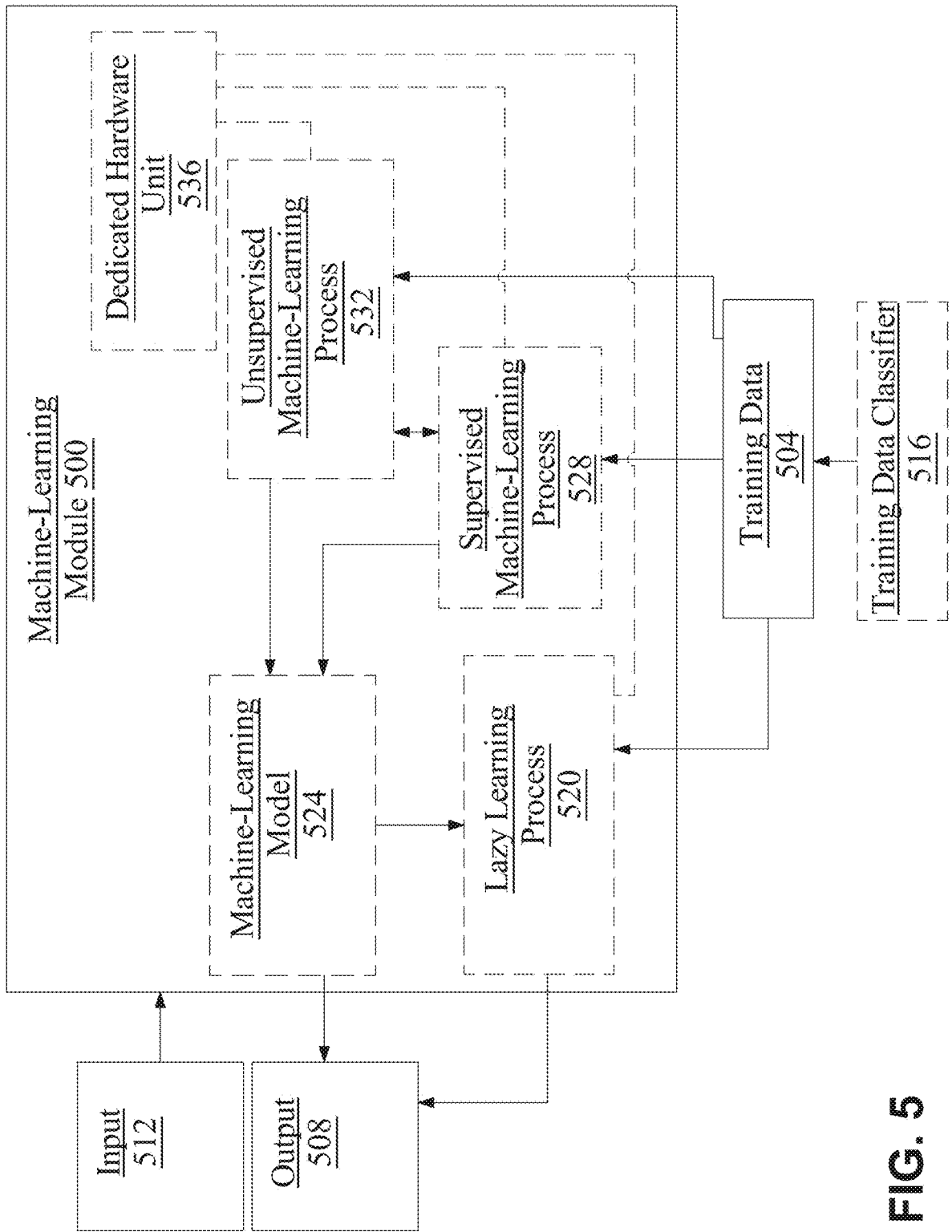
FIG. 5 is a block diagram of an exemplary embodiment of a machine learning model.
Figure 6:
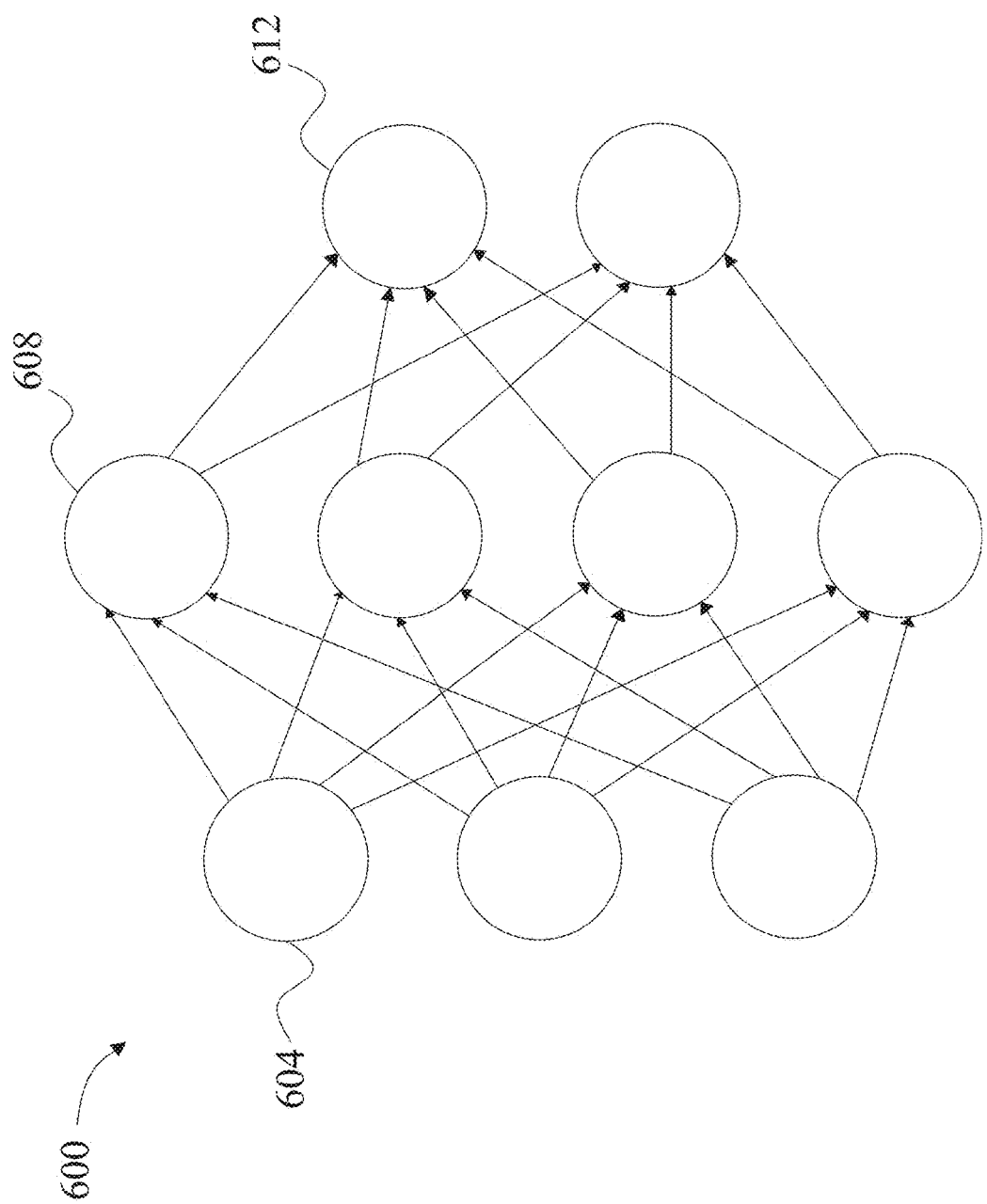
FIG. 6 is a schematic diagram of an exemplary embodiment of a neural network.
Figure 7:
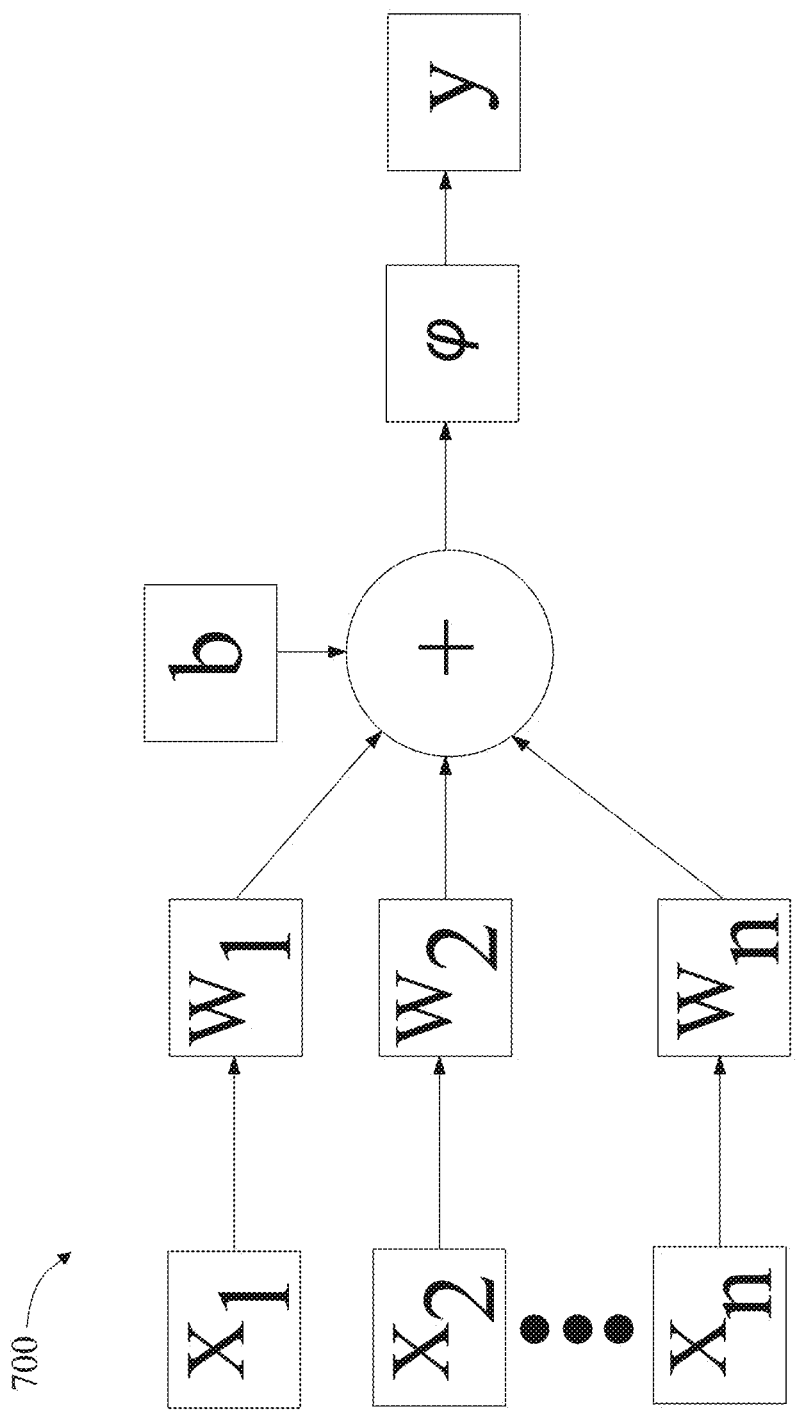
FIG. 7 is a schematic diagram of an exemplary embodiment of a neural network node.

Still referring to FIG. 3, in some embodiments, TEE echocardiogram data, including images showing heart structures and, in some cases, angle of acquisition, may be used as input to any machine learning process described in this application, for instance with reference to FIGS. 5-7. For instance TEE echocardiogram data may be used to reconstruct 3D heart models. In some cases, TEE echocardiogram data is input into a machine learning model that outputs a 3D heart model (e.g., 3D mesh model and/or statistical shape model).

Still referring to FIG. 3, in some embodiments, TEE may be a preferred imaging modality for structural heart interventions, such as without limitation left atrial appendage occlusion (LAOO) and aortic/mitral/other heart valve replacement procedures. In some cases, technology and improvements described in this disclosure permit creation and/or modification of a 3D heart mesh from TEE data to aid in planning implant size selection, as well as to guide implantation procedures. In some cases, virtual placement of a 3D model of a candidate implant (such as without limitation LAOO device and/or heart valve implants) can be simulated on a 3D heart model generated by any method described in this disclosure. This novel and improved functionality may validate appropriate size and placement of implants within heart 320, as well as other organs within body of patient 304. For example, in the context of electrophysiology procedures, TEE 300 can be used to create heart anatomical models that can be used as reference for electroanatomic mapping, and guidance of ablation catheters for atrial fibrillation procedures (such as without limitation pulmonary vein isolation).

Still referring to FIG. 3, in some embodiments, applications described with reference to TEE 300 above can be extended for use with TTE and point of care ultrasound (POCUS). In some cases, both TTE and POCUS may acquire ultrasound images of chest/surface of patient 304. In some cases, TTE and POCUS data may be used as an input (and/or training data) for any machine learning process described in this disclosure, for instance with reference to FIGS. 5-7. In some cases, use of TTE and/or POCUS data (in machine learning processes described in this disclosure)

may require adjustment in ultrasound acquisition parameters and positions to acquire a sufficient number of frames for 3D reconstruction. In some cases, TTE and POCUS offer improved accessibility (with POCUS being portable/mobile as well) and non-invasive 3D heart modeling, often without anesthesia or sedation, compared to catheterized 3D heart modeling commonly performed today for electroanatomical mapping and ablation procedures.

Figure 4:
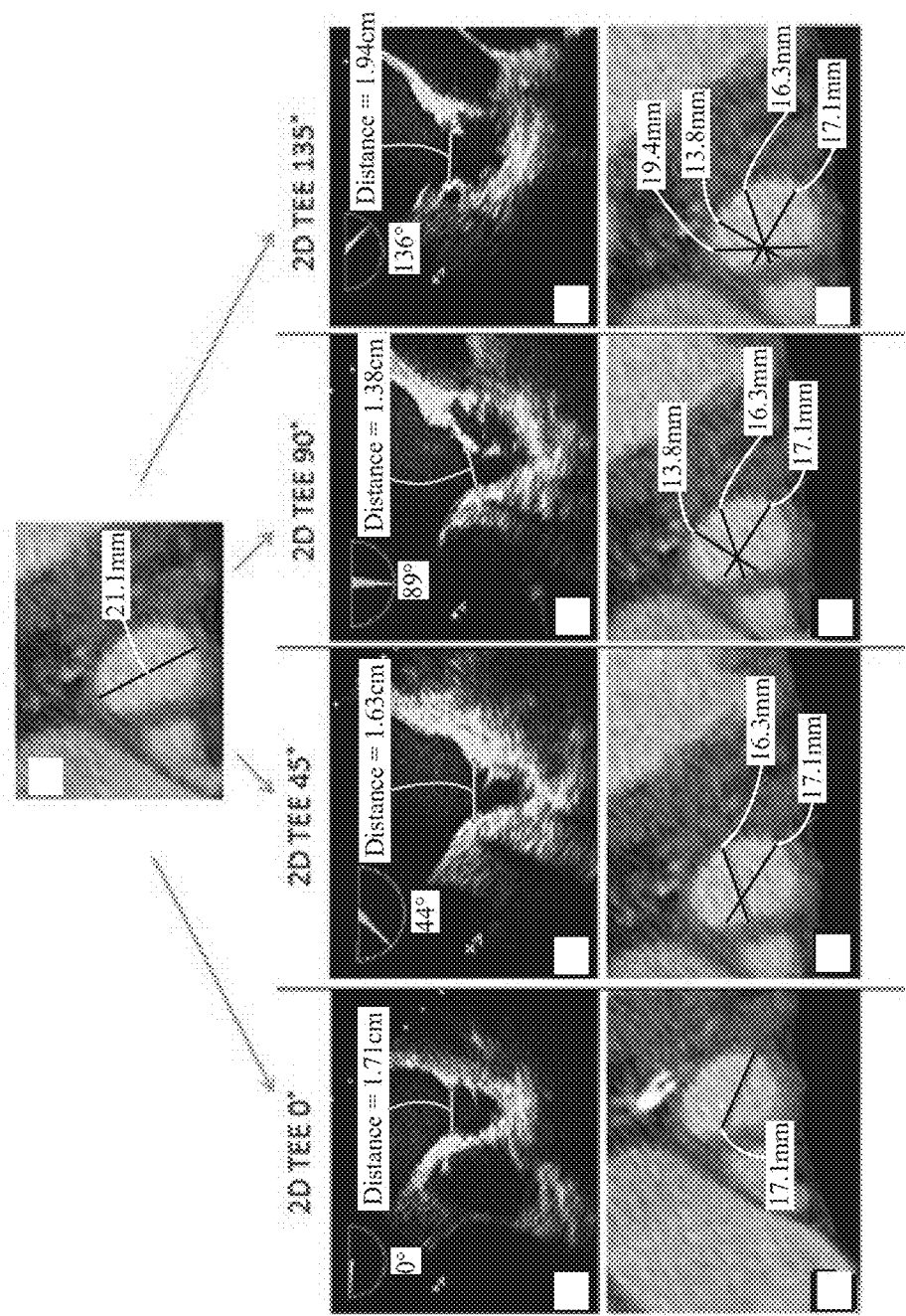
FIG. 4 presents 2D transesophageal echocardiogram (TEE) views at varying orientations.

Referring now to FIG. 4, multiple 2D transesophageal echocardiogram (TEE) views at varying orientations are presented. Image A demonstrates a maximal LAA diameter of 21.1 mm obtained utilizing the double-oblique multiplanar reconstruction methodology by 3D CT. Panels B-E demonstrate the traditional 2D TEE LAA scanning views of 0°, 45°, 90°, and 135° views reflected on a multiplanar reconstruction of the LAA ostium on 3D CT. In panels F-I, the CT dimensions are taken at a focal intersection point and angled, from 0° (assigned as the measurement of 17.1 mm), and increased by 45° around this focal point for each subsequent measurement. Panel I demonstrate in this patient the 135° TEE measurement of 19.4 mm as off-axis to the true centroid of the LAA, and is not reflective of the maximal LAA width as shown in panel A, thereby resulting in an undersized WATCH MAN device. By CT, this patient would receive a 24 mm device with no peri-watchman leak.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example inputs of CT data and outputs of 3D models.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to characterize data as real or as fake.

Still referring to FIG. 5, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)+P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naive Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{min}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a a set or subset $X_{median}$ and/or interquartile range (IQ R), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 5, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples.

Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Referring now to FIG. 7, an exemplary embodiment of a node 700 of a neural network is illustrated. Anode may include, without limitation a plurality of inputs x that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

tanh derivative function such as $f(x)=\tanh^2(x)$, a rectified linear unit function such as $f(x)=\max(0,x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs x that may be used as activation functions. As a non-limiting and illustrative example, node may perform a weighted sum of inputs using weights w that are multiplied by respective inputs x. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight w applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w may be determined by training a neural network using training data, which may be performed using any suitable process as described above.

Figure 8:
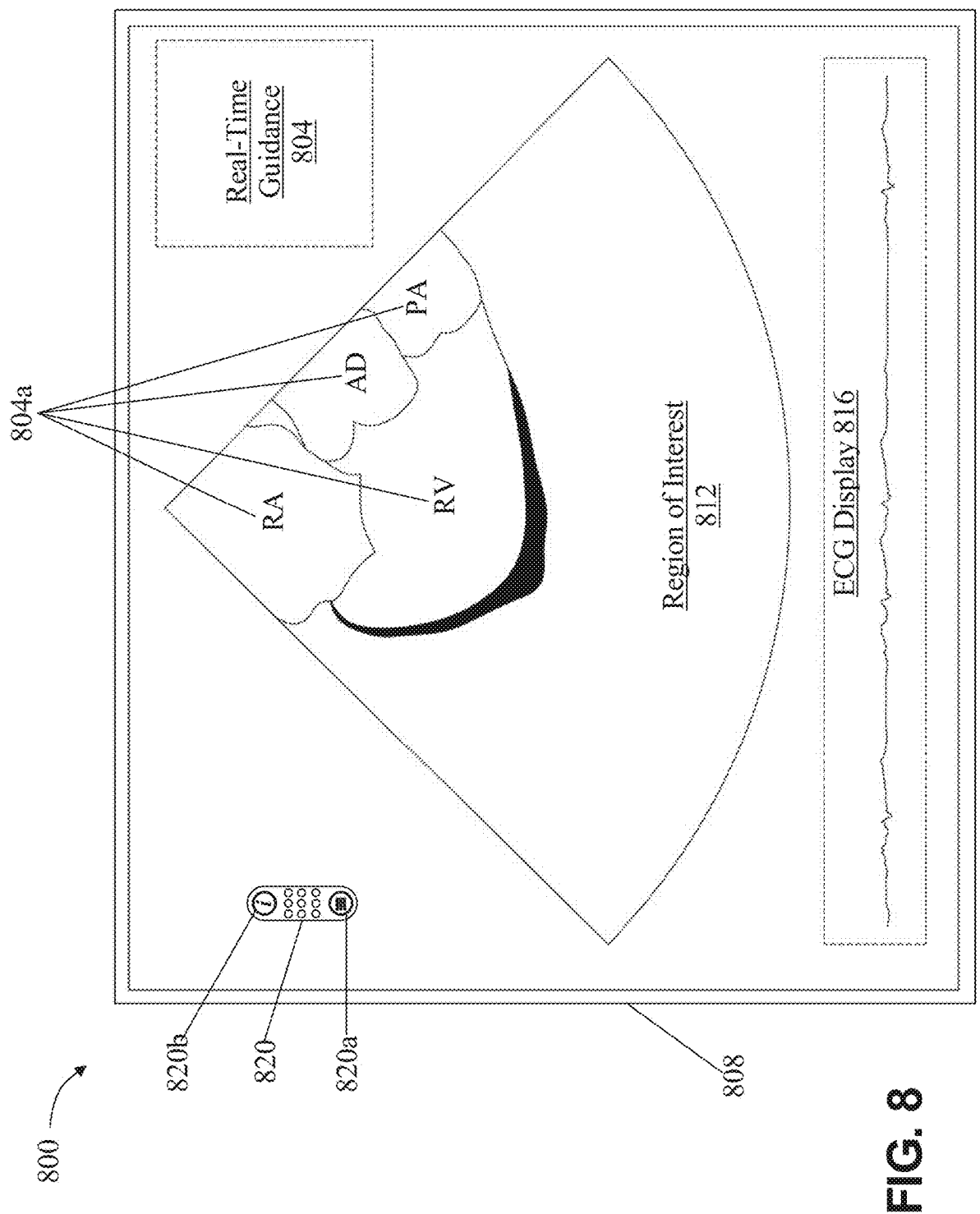
FIG. 8 is an exemplary graphical user interface displaying the real-time guidance generated by a system for sweep trajectory guidance.

Now referring to FIG. 8, illustrated is an exemplary graphical user interface 800 displaying real-time guidance 804 generated by a system for sweep trajectory guidance. In an embodiment, graphical user interface 800 may be displayed at a display device 808. Further, graphical user interface 800 may display a region of interest 812 overlaid with real-time guidance 804. In some embodiments, real-time guidance 804 may include on-screen guidance 804*a*, which may aid a user in identifying one or more regions displayed in a region of interest 812. In one or more embodiments, real-time guidance may include a window that may display one or more adjustment recommendations and/or adherence metrics with an optimal sweep trajectory. Further, in some cases, graphical user interface 800 may include an ECG display 816, wherein graphical user interface 800 may display an ultrasound image, a 3D model, and/or ECG data. Specifically, for example, ECG data may be displayed at ECG display 816. In some embodiments, 3D model may be displayed in graphical user interface 800.

In continued reference to FIG. 8, in an embodiment, graphical user interface 800 may include a menu bar 820. In some cases, menu bar 820 may be moved to different areas of the display. For example, if menu bar 820 blocks a view, a user may click and drag menu bar 820 to another portion of the display. In an embodiment, menu bar 820 may include a menu button 820*a* and/or an information button 820*b*. Menu button 820*a* may allow a user to toggle into different views, and/or tools wherein each of the views and/or tools correspond to real-time guidance 804. For example, a user may toggle into menu button 820*a* and click into a view with an optimal sweep trajectory overlay, wherein the overlay includes a grid and/or a colored line that is meant to be followed. Menu button 820*a* may also allow a user to adjust other real-time guidance 804, such as auditory feedback, haptic feedback, and/or other visual feedback. In an embodiment, information button 820*b* may allow a user to toggle into a pop-up window that displays metadata of the current procedure. For example, this may include ultrasound settings, time data, progress data, adherence data, and/or the like.

Figure 9:
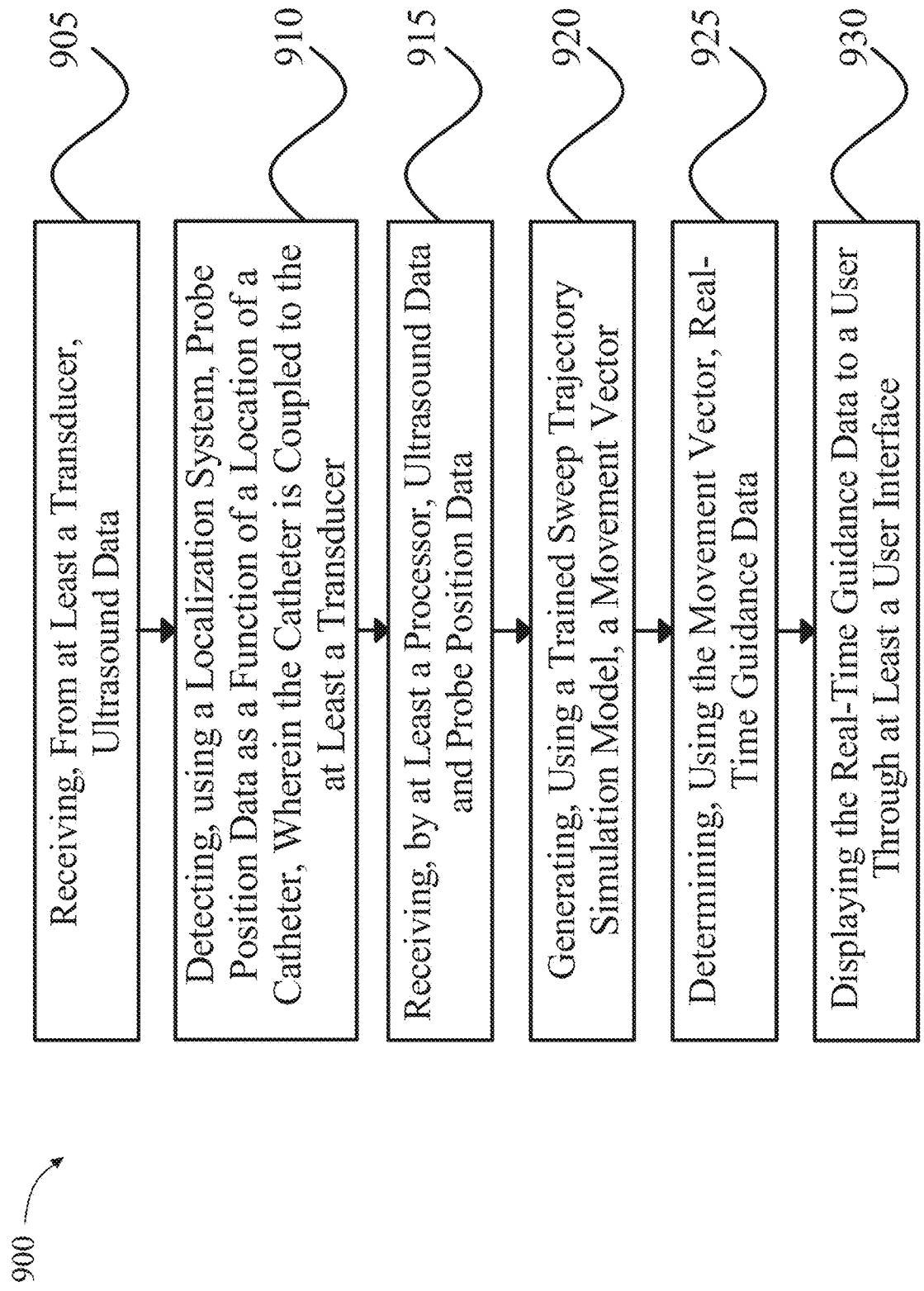
FIG. 9 is a flow diagram depicting an exemplary embodiment of a method of sweep trajectory simulation.

Now referring to FIG. 9, an exemplary flow diagram of a method 900 for sweep trajectory guidance is illustrated. Method 900 may include a step 905 of receiving, from at least a transducer, ultrasound data. This may be implemented, without limitation, as referenced in FIGS. 1-8. Method 900 may include a step 910 of detecting, using a localization system, probe position data as a function of a location of the catheter, wherein the catheter is coupled to the at least a transducer. This may be implemented, without limitation, as referenced in FIGS. 1-8. Method 900 may include a step 915 of receiving, by at least a processor, ultrasound data and probe position data. This may be implemented, without limitation, as described in reference to FIGS. 1-8. Method 900 may include a step 920 of generating, using a trained sweep trajectory simulation model, a movement vector as a function of the ultrasound data and the probe position data. In an embodiment, the trained sweep trajectory simulation model may include a reinforcement learning model trained using computed tomography. Further, a 3D model generator may be configured to generate a 3D model and the trained sweep trajectory simulation model may be configured to display, at the user interface, the catheter position in relation to the 3D model as a function of the probe position data. This may be implemented, without limitation, as described in reference to FIGS. 1-8.

Method 900 may include a step 925 of determining, using the movement vector, real-time guidance data. In an embodiment, the real-time guidance may indicate an optimal movement of a catheter as predicted by the trained sweep trajectory simulation model. Further, the real-time guidance may include one or more of: visual feedback, auditory feedback, and/or haptic feedback. In some instances, the real-time guidance may include visual feedback such as an on-screen visual, and the on-screen visual may be displayed at a display device as a function of the real-time guidance. In some cases, the real-time guidance may include a performance metric wherein the performance metric is determined as a function of comparing a user's actions against an optimal movement predicted by the trained sweep trajectory simulation model, and the performance metric is displayed, at a display device, in real-time. In one or more embodiments, the real-time guidance may be continuously updated as a function of changes in the ultrasound data and the probe position data. In some cases, real time guidance may include a set of visual indicators, wherein the set of visual indicators show a relative proximity of a catheter to a target area, and the set of visual indicators are updated as a function of one or more movements of a catheter. This may be implemented, without limitation, as described in reference to FIGS. 1-8.

Method 900 may include a step 930 of displaying the real-time guidance data to a user through at least a user interface. In an embodiment, step 930 may further include displaying, through the user interface, the ultrasound data as an ultrasound image and overlay, on the ultrasound image, the real-time guidance. This may be implemented, without limitation, as described in reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DV D, DV D-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
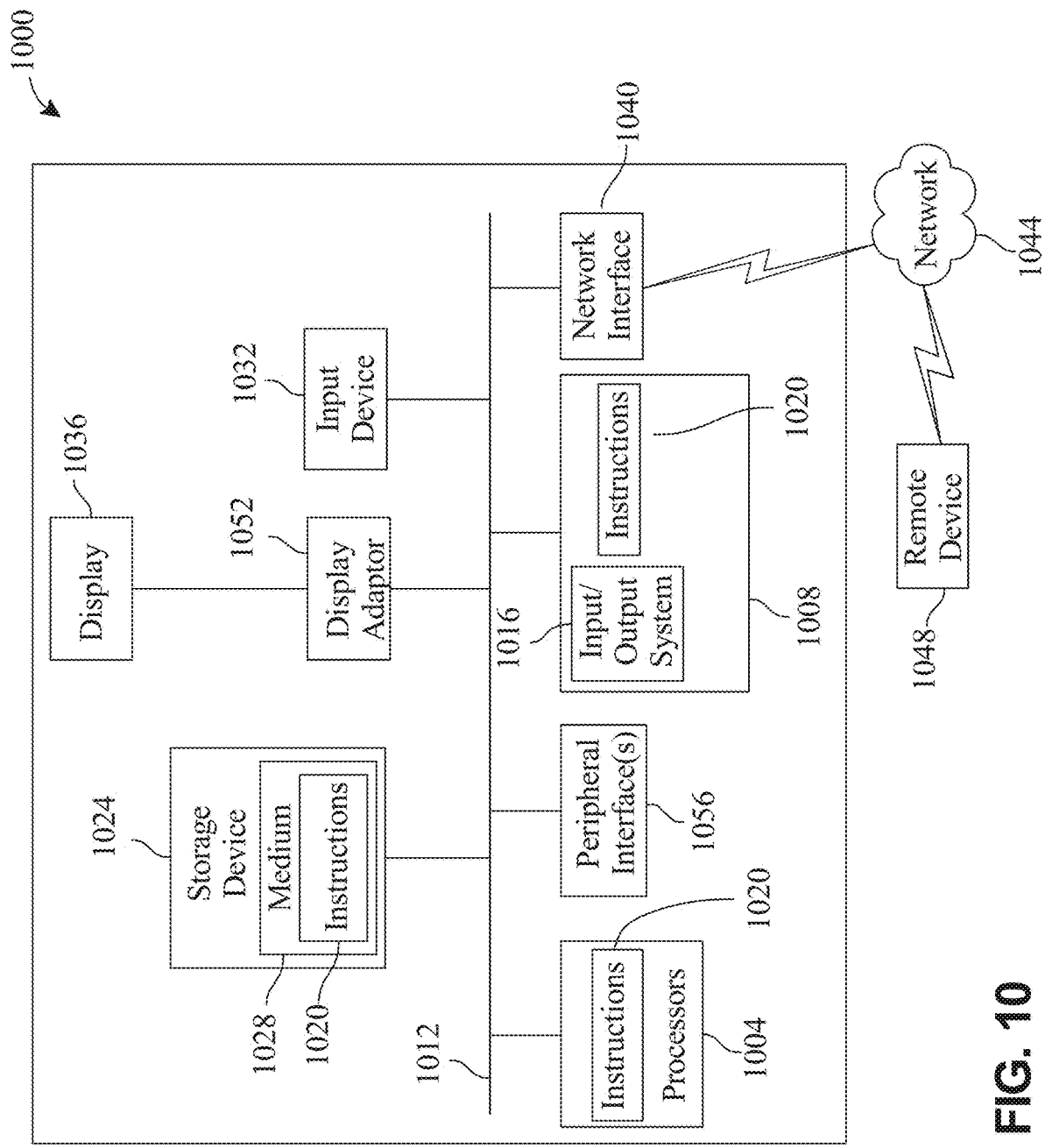
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (A L U), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable GateArray (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment(ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display 1036. Examples of a display device include, but are not limited to, a liquid crystal display (LCD), a cathode ray tube (CRT), a plasma display, a light emitting diode (LED) display, and any combinations thereof. Display adapter 1052 and display 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIRE WIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for sweep trajectory guidance, wherein the system comprises:
   a catheter coupled to at least a transducer, wherein the at least a transducer is configured to receive ultrasound data;
   at least a localization system configured to detect probe position data as a function of a location of the catheter;
   at least a processor communicatively connected to the transducer; and
   a memory communicatively connected to the at least a processor, wherein the memory contains instructions configuring the at least a processor to:
   receive, by the at least a processor, the ultrasound data and the probe position data;
   generate, using a trained sweep trajectory simulation model, at least a movement vector as a function of the ultrasound data and the probe position data, wherein the trained sweep trajectory simulation model is trained using a reinforcement learning model to correlate the ultrasound data and the probe position data to the at least a movement vector, wherein correlating the ultrasound data and the probe position data to the at least a movement vector comprises determining a degree of correlation between the ultrasound data and the probe position data to the at least a movement vector;
   determine, using the movement vector, real-time guidance data; and
   display the real-time guidance data to a user through at least a user interface.

2. The system of claim 1, wherein:
   the real-time guidance data indicates an optimal movement of the catheter as predicted by the trained sweep trajectory simulation model; and
   the real-time guidance data comprises one or more of visual feedback, auditory feedback, or haptic feedback.

3. The system of claim 1, further comprising a display device, wherein:
   the real-time guidance data comprises visual feedback, wherein visual feedback comprises an on-screen visual guide; and
   the display device is configured to display the visual feedback to a user as a function of the real-time guidance data.

4. The system of claim 1, wherein:
   the real-time guidance data comprises a performance metric, wherein the performance metric is determined as a function of comparing a user's actions against an optimal movement predicted by the trained sweep trajectory simulation model; and
   the performance metric is displayed, at a display device, in real-time.

5. The system of claim 1, wherein the at least a processor is further configured to:
   display, through the user interface, the ultrasound data as an ultrasound image; and
   overlay, on the ultrasound image at the user interface, the real-time guidance, wherein the real-time guidance data comprises visual feedback configured to direct a user in real-time to adjust the catheter's position.

6. The system of claim 1, wherein the at least a processor is further configured to continuously update the real-time guidance data as a function of one or more changes in the ultrasound data and probe position data.

7. The system of claim 1, wherein:
   the real-time guidance data comprises a set of visual indicators, wherein the set of visual indicators show a relative proximity of the catheter to a target area; and
   the processor is further configured to update the set of visual indicators as a function of one or more movements of the catheter.

8. The system of claim 1, wherein the trained sweep trajectory simulation model comprises a reinforcement learning model trained using computed tomography data.

9. The system of claim 1:
further comprising a 3D model generator configured to generate a 3D model of a target region using the ultrasound data; and
wherein the trained sweep trajectory simulation model is further configured to display, at the user interface, the catheter's position in relation to the 3D model as a function of the probe position data.

10. The system of claim 1, wherein:
the ultrasound data and the probe position data are real data; and
the ultrasound data and the probe position data are received from a real ultrasonic procedure.

11. A method for sweep trajectory guidance, wherein the method comprises:
receiving, from at least a transducer, ultrasound data;
detecting, using a localization system, probe position data as a function of a location of a catheter, wherein the catheter is coupled to the at least a transducer;
receiving, by at least a processor, the ultrasound data and the probe position data;
generating, using a trained sweep trajectory simulation model, at least a movement vector as a function of the ultrasound data and the probe position data, wherein the trained sweep trajectory simulation model is trained using a reinforcement learning model to correlate the ultrasound data and the probe position data to the at least a movement vector, wherein correlating the ultrasound data and the probe position data to the at least a movement vector comprises determining a degree of correlation between the ultrasound data and the probe position data to the at least a movement vector;
determining, using the movement vector, real-time guidance data; and
displaying the real-time guidance data to a user through at least a user interface.

12. The method of claim 11, wherein:
the real-time guidance data indicates an optimal movement of the catheter as predicted by the trained sweep trajectory simulation model; and
the real-time guidance data comprises one or more of visual feedback, auditory feedback, or haptic feedback.

13. The method of claim 11, wherein:
the real-time guidance data comprises visual feedback, wherein visual feedback comprises an on-screen visual guide; and
a display device is configured to display the visual feedback to a user as a function of the real-time guidance data.

14. The method of claim 11, wherein:
the real-time guidance data comprises a performance metric, wherein the performance metric is determined as a function of comparing a user's actions against an optimal movement predicted by the trained sweep trajectory simulation model; and
the performance metric is displayed, at a display device, in real-time.

15. The method of claim 11, further comprising:
displaying, through the user interface, the ultrasound data as an ultrasound image; and
overlaying, on the ultrasound image at the user interface, the real-time guidance, wherein the real-time guidance data comprises visual feedback configured to direct a user in real-time to adjust a catheter's position.

16. The method of claim 11, further comprising continuously updating the real-time guidance data as a function of one or more changes in the ultrasound data and probe position data.

17. The method of claim 11, wherein:
the real-time guidance data comprises a set of visual indicators, wherein the set of visual indicators show a relative proximity of a catheter to a target area; and
the processor is further configured to update the set of visual indicators as a function of one or more movements of the catheter.

18. The method of claim 11, wherein the trained sweep trajectory simulation model comprises a reinforcement learning model trained using computed tomography data.

19. The method of claim 11:
further comprising a 3D model generator configured to generate a 3D model of a target region using the ultrasound data; and
wherein the trained sweep trajectory simulation model is further configured to display, at the user interface, a catheter's position in relation to the 3D model as a function of the probe position data.

20. The method of claim 11, wherein:
the ultrasound data and the probe position data are real data; and
the ultrasound data and the probe position data are received from a real ultrasonic procedure.

* * * * *